(12) United States Patent
Lin-Hendel

(10) Patent No.: US 10,282,779 B2
(45) Date of Patent: *May 7, 2019

(54) SYSTEM FOR INTERACTIVE COMPUTER-ASSISTED ON-LINE AUCTIONS

(71) Applicant: Catherine Lin-Hendel, Summit, NJ (US)

(72) Inventor: Catherine Lin-Hendel, Summit, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/271,366

(22) Filed: May 6, 2014

(65) Prior Publication Data

US 2015/0324898 A1 Nov. 12, 2015
US 2017/0249695 A9 Aug. 31, 2017

Related U.S. Application Data

(63) Continuation of application No. 15/330,939, filed on Mar. 12, 2014, now Pat. No. 10,019,753, which is a
(Continued)

(51) Int. Cl.
G06Q 30/00 (2012.01)
G06Q 30/08 (2012.01)
G06Q 30/06 (2012.01)

(52) U.S. Cl.
CPC ......... *G06Q 30/08* (2013.01); *G06Q 30/0601* (2013.01); *G06Q 30/0643* (2013.01)

(58) Field of Classification Search
CPC . G06Q 30/08; G06Q 30/0601; G06Q 30/0643
See application file for complete search history.

(56) References Cited

U.S. PATENT DOCUMENTS 5,835,896 A * 11/1998 Fisher ............... G06Q 40/04
705/26.3
5,848,399 A * 12/1998 Burke ............... G06Q 10/087
235/383

(Continued)

OTHER PUBLICATIONS

Gerald L. Lohse et al. "Electronic Shopping", Communications of the ACM, Jul. 1998 / vol. 41, No. 7, pp. 81-88. (Year: 1998).*

(Continued)

*Primary Examiner* — Naeem U Haq
(74) *Attorney, Agent, or Firm* — Douglas L. Weller

(57) ABSTRACT

A system and method for an interactive, computer-assisted on-line auction wherein at least one array of images of objects for auction are scrolled on a display device so that a viewer can view the objects, obtain detailed information regarding objects of interest an submit bids on those objects the viewer desires to purchase. The objects in the array can be sorted into rows and columns by criteria such as manufacturer, type of good, or time until which bids are accepted. The system can include an array for objects that can currently be bid upon and another array for objects that can be bid upon at a future time. Certain objects of interest to a viewer can be selectively rotated for three-dimensional viewing by clicking on an appropriate button. A viewer can select a plurality of objects of interest, wherein monitoring screens are then composed and displayed on the display device for each selected object, each monitoring screen providing the viewer with an enlarged graphical representation of an object, detailed textual information regarding an object, and information regarding the auction for an object such as current bid price, time remaining to submit a bid and a bid submission box. The system also provides a system of selectively programmable alerts which can use visual or audible cues to alert the viewer to some occurrence, such as
(Continued)

a predetermined amount of time remaining to submit a bid on an object.

20 Claims, 39 Drawing Sheets

Related U.S. Application Data continuation of application No. 13/472,226, filed on May 15, 2012, now Pat. No. 8,688,546, which is a continuation of application No. 12/464,047, filed on May 11, 2009, now Pat. No. 8,204,801, which is a continuation of application No. 09/628,773, filed on Jul. 29, 2000, now Pat. No. 7,542,920.

(60) Provisional application No. 60/146,702, filed on Jul. 30, 1999.

(56) References Cited

U.S. PATENT DOCUMENTS

| | | | | |
|---|---|---|---|---|
| 6,029,141 | A * | 2/2000 | Bezos | G06Q 20/0855 705/26.41 |
| 7,627,354 | B2 * | 12/2009 | Khazaka | G06F 1/1626 382/296 |
| 8,204,801 | B2 * | 6/2012 | Lin-Hendel | 705/27.2 |
| 8,676,720 | B1 * | 3/2014 | Neal et al. | 705/343 |
| 8,731,244 | B2 * | 5/2014 | Wu | G06T 5/006 382/105 |
| 2003/0236752 | A1 * | 12/2003 | Dawson | G06Q 30/06 705/54 |
| 2006/0059062 | A1 * | 3/2006 | Wood | G06Q 40/00 705/35 |

OTHER PUBLICATIONS

Michael Bloch et al. "On the Road of Electronic Commerce—a Business Value Framework, Gaining Competitive Advantage and Some Research Issues", Mar. 1996, pp. 1-19. (Year: 1996).*

* cited by examiner

 Home Listings Buyers Sellers Search Help News/Chat Site Map

Test drive the new site. Check out the new Help section!
Save time! Try the new, fun way to chop - the Gallery.

Updated: 07/15/99, 15:00 PDT Check eBey official time
Use your browser's reload button to see the latest version.

Sell your item in the Antiques : Furniture category

Subscribe now! Get your charter subscription to eBey magazine.

| Search |
☐ Search only in Antiques: Furniture
☐ Search within titles and descriptions ◄ Top : Antiques : Furniture ►
Current Auctions Current || New Today || Ending Today || Completed || Going, Going, Gone || Gallery

| Featured Auctions in Furniture |
| Current Auctions |

To find out how to be listed in this section and seen by thousands, please visit this link.

| Item | Price | Bids | Ends PDT |
|---|---|---|---|
| 18th Century Chippendale Desk Rhode Island | $1000.00 | - | 07/22 12:42 |
| OAK ROCKER-CRUVED SLAT BACK-ARMS-SOFT MISSION | $59.00 | - | 07/25 11:11 |
| GREAT VICTORIAN CARVED THRONE CHAIR | $40.00 | - | 07/22 11:03 |
| EARLY VICTORIAN WALNUT CARVED MT. PIER TABLE | $200.00 | - | 07/22 10:59 |
| CHOICE FIGURED BREAK FRONT. HEPPLEWHITE | $250.00 | - | 07/22 10:51 |
| OAK ROCKING ARM CHAIR- QUARTER SAWN BACK | $59.00 | - | 07/25 10:46 |
| RARE BOMBE MARQUETRY DESK | $300.00 | - | 07/22 10:46 |
| VICTORIAN MARQUETRY ARM CHAIR | $100.00 | - | 07/22 10:41 |
| VICTORIAN BEDROOM SET - WALNUT WITH MARBLE | $1500.00 | 1 | 07/25 09:36 |
| OAK SERPENTINE DRESSER - MIRROR ON WISHBONE | $99.00 | - | 07/25 09:25 |
| Art Nouveau French Bed w/ Inlay L@@K!!! | $400.00 | - | 07/25 09:22 |

FIG. 1B (Prior Art)

| | | | |
|---|---:|---:|---|
| OAK BOOKCASE/CHINA CABINET~STRETCHER BASE~2D | $99.00 | - | 07/25 08:14 |
| wonderful 4 dr. silver chest | $177.50 | 2 | 07/22 07:14 |
| PAIR OF SOLID MAHOGANY SEWING/NITE/SIDE STAND | $152.50 | 6 | 07/21 21:51 |
| CARVED, CLAW FOOT ZEBRA MAHOGANY CENTER TABLE | $152.50 | 9 | 07/21 21:38 |
| FOUR PERIOD JACOBEAN HEAVILY CARVED CHAIRS | $100.00 | - | 07/21 21:26 |
| SUPER TURN OF THE CENTURY OAK VICTORIAN SECRETARY | $680.00 | 11 | 07/24 19:56 |
| RARE! Kate Gleason Owned Carved Figural Chair | $250.00 | - | 07/21 19:52 |
| GREAT 1940S WALNUT TEA CART | $51.00 | 2 | 07/21 19:40 |
| C1900 AMERICAN OAK LIONSHEAD CLAWFOOT TABLE | $1725.00 | 26 | 07/21 19:23 |
| 1790-1820 Hooded Primitive Cradle~Stenciling! | $21.00 | 3 | 07/21 19:19 |
| ANTIQUE SELECT OAK FLOORING, 1000sq.ft. | $2700.00 | - | 07/21 19:14 |
| SUPERB MAHOGANY CURVED GLASS CORNER CHINA | $187.50 | 9 | 07/21 18:37 |
| Wonderful Country Victorian Washstand | $86.00 | 4 | 07/21 18:37 |
| Shell Back Chippendale Chairs (8) L@.@K>>> | $404.00 | 6 | 07/21 18:19 |
| TIGER MAPLE CHEST Circa 1800 | $227.50 | 3 | 07/21 18:17 |
| HIGHLY CARVED AMERICAN CHIPPENDALE BREAKFRONT | $635.00 | 7 | 07/21 16:49 |
| OA Offers: French Boudoir chairs -1920's | $45.00 | 8 | 07/21 15:23 |
| LARGE WALNUT VICTORIAN BOOKCASE | $695.00 | 2 | 07/24 15:20 |
| OA Offers: 1800's Rickshaw | $15.50 | 3 | 07/24 15:19 |
| OA Offers: Biedermeier Style Wall Sconces | $102.50 | 12 | 07/24 15:15 |
| Edwardian English Oak TEA STAND~DUMB WAITER | $50.00 | 1 | 07/21 15:01 |
| Like New LANE CEDAR CHEST (1944) | $61.00 | 4 | 07/21 14:29 |
| Outstanding "DECO" Waterfall Cedar Chest | $102.50 | 6 | 07/21 14:05 |
| FLAME MAHOGANY GAME TABLE c. 1820 (PIX) | $455.00 | 12 | 07/24 13:39 |
| ANTIQUE WICKER DESK AND CHAIR | $100.00 | 1 | 07/21 13:34 |
| REGENCY DINING/CONFERENCE TABLE-15 FT LONG | $1500.00 | - | 07/21 13:31 |
| CARVED VICTORIAN STOOL | $81.00 | 5 | 07/21 13:18 |

FIG. 1C (Prior Art)

| | | | |
|---|---|---|---|
| ELABORATE ITALIAN ROSEWOOD ETAGERE | $255.00 | 5 | 07/21 13:04 |
| RARE EBONY. ORMOLU DAVENPORT DESK | $405.00 | 3 | 07/21 12:47 |
| GREAT BELDING THIRTEEN DRAWER SPOOL CABINET | $925.00 | 4 | 07/21 12:38 |
| ANTIQUE WICKER TABLE | $50.00 | - | 07/21 12:33 |
| CARVED CHIPPENDALE LOWBOY MAHOG. CENTENNIAL | $300.00 | - | 07/21 12:30 |
| FABULOUS 19TH CENTURY EARLY EMPIRE ABATTANT | $405.00 | 3 | 07/21 12:26 |
| CARVED CHIPPENDALE DESK. MAHOG. CENTENNIAL | $350.00 | - | 07/21 11:10 |
| SMALL HEPPEL WHITE LADIES DESK | $300.00 | - | 07/21 11:06 |
| 1930s Radio Cabinet - Very Nice!!! | $105.00 | 1 | 07/21 07:56 |
| Heavily Carved Mah Console Table w/ Marble | $200.00 | - | 07/21 06:59 |
| 1940s Drum Table w/ Leather Tou & Lion Heads | $112.50 | 3 | 07/20 22:43 |
| 1940s Clawfoot Drum Table w/ Leather Top | $105.00 | 1 | 07/20 22:29 |
| Victorian Era Birds Eye Maple Dresser Box pic | $33.00 | 10 | 07/20 19:44 |
| MAHOGANY SUPER GRAIN TALL CHEST | $152.50 | 6 | 07/20 19:37 |
| Super Victorian Cast Iron Smoke Stand pic. | $14.50 | 3 | 07/20 19:14 |
| SET OF 4 MAHOGANY CHAIRS >>> MUST SEE !! | $100.00 | - | 07/20 19:00 |
| Rare 1930s Mahogany Ducan Phyfe Game Table pic | $76.00 | 18 | 07/20 18:26 |
| Antique Pa, Sawbuck Table | $187.50 | 4 | 07/20 17:23 |
| Antique Leather Chair | $405.00 | 12 | 07/20 16:53 |
| 3 Set of Cane Furniture circa 1910 | $200.00 | 2 | 07/20 16:40 |
| RARE TIGER MAPLE SEWING CABINET c.1820 (PIX) | $490.50 | 6 | 07/23 15:10 |
| RARE Victorian Writing Desk -Museum Quality | $355.00 | 8 | 07/20 14:31 |
| ANTIQUE HEART PINE FARM TABLE 4x8 | $1000.00 | - | 07/23 12:23 |
| (HERTER?) ROSEWOOD/MARCO/CHAIR. MUSEUM QUALITY | $800.00 | 1 | 07/23 11:53 |
| 18TH OR EARLY 19TH CENTURY DESK | $356.00 | 7 | 07/20 11:04 |
| OA Offers: Library Table | $810.00 | 10 | 07/23 10:57 |
| EXQUISITE HAND-CARVED VICTORIAN PARLOR SET NR! | $595.00 | 20 | 07/17 20:34 |
| COUNTRY STORE BLACK WALNUT SPOOL CABINET | $102.50 | 10 | 07/19 20:11 |
| VICTORIAN WALNUT MIRROR | $66.00 | 12 | 07/19 20:09 |

FIG. 1D (Prior Art)

| | | | |
|---|---|---|---|
| OAK LAWYER'S MISSION SECTION BOOKCASE | $510.00 | 26 | 07/19 20:05 |
| VICTORIAN MAHOGANY INLAID CLAW FOOT CREDENZA | $860.00 | 7 | 07/19 19:58 |
| BARE CORTICELLI SLANT-BACK SPOOL CABINET | $1225.00 | 10 | 07/19 18:59 |
| Antique Old Hickory Rocker | $61.00 | 2 | 07/19 17:44 |
| Victorian Tall Pressed Back Painted Rocker | $41.00 | 4 | 07/19 17:25 |
| Antique Walnut Roll Top Desk | $561.00 | 16 | 07/19 17:10 |
| RARE CLARK'S RED GLASS 6 DRAWER SPOOL CABINET | $2301.00 | 22 | 07/17 14:47 |
| Fantastic English Pub Bar - Take A Look | $4000.00 | - | 07/22 12:22 |
| - Rare 1930's Hammond Electric Bridge Table - | $227.50 | 5 | 07/19 11:34 |
| OA Offers: Old World Dining Suite | $910.00 | 15 | 07/22 08:56 |
| FANTASTIC CARVED OAK BOOKCASE | $1850.00 | 17 | 07/18 21:55 |
| OAK SIDE-BY-SIDE BOOKCASE / DROPFRONT DESK | $1999.00 | 15 | 07/18 21:49 |
| FAINTING COUCH with Serpentine Curves ... NICE! | $415.00 | 6 | 07/18 20:22 |
| FANTASTIC FRENCH SATINWOOD BEDROOM SET | $3050.50 | 20 | 07/20 19:37 |
| Beautiful Walnut burrel top table, ANTIQUE | $242.50 | 22 | 07/18 20:08 |
| FANCY MAHOGANY CARVED STAND | $51.00 | 2 | 07/21 19:56 |
| MAHOGANY CHIPPENDALE SECRETARY BOOKCASE | $660.00 | 23 | 07/18 19:50 |
| MAHOGANY 3 DRAWER NIGHTSTAND | $365.00 | 20 | 07/18 19:46 |
| FLAMBE MAHOGANY 3 PIECE COFFEE TABLE SET | $560.00 | 20 | 07/18 19:41 |
| SET OF 5 SHIELD BACK CHAIRS - 2 ARM CHAIRS! | $535.00 | 12 | 07/18 19:36 |
| BEAUTIFUL MAHOGANY DINING ROOM SUITE | $2025.00 | 16 | 07/18 19:33 |
| SET 4 TIGER OAK CLAW FOOT CHAIRS | $203.50 | 12 | 07/18 19:32 |
| WALNUT QUEEN ANNE LEATHER ARM CHAIR | $300.00 | 17 | 07/18 19:28 |
| OAK LARKIN Secretary DESK ...... NICE L@@K! | $222.50 | 3 | 07/18 19:28 |
| MAHOGANY LAWYER'S SECTIONAL BOOKCASE | $635.00 | 19 | 07/18 19:24 |
| FINE FLAME MAHOGANY BUBBLEGLASS BREAKFRONT | $2550.00 | 14 | 07/18 19:24 |
| Best Victorian Oak Hall Seat on Ebay L@@K | $735.00 | 14 | 07/18 18:07 |
| Super Pair of Mahogany leather top end tables | $455.50 | 15 | 07/18 17:51 |
| Minature Cherry Blanket Chest PIC | $343.00 | 12 | 07/18 14:47 |
| Outstanding set Butterfly Wing Oak Chairs (6) | $600.00 | 13 | 07/18 09:31 |

FIG. 1E (Prior Art)

| | | | |
|---|---|---|---|
| OLD ART NOUVEAU WRITING TABLE | $76.00 | 5 | 07/20 19:00 |
| BEAUTIFUL OLD TABLE WITH MARQUETRY | $355.00 | 14 | 07/20 18:55 |
| OA Offers: Pair of Art Deco Consoles | $760.00 | 2 | 07/20 10:26 |
| OA Offers: A Pair of Art Deco Chairs - 1920's | $290.00 | 7 | 07/20 10:08 |
| Belter Rosewood Tuthill King Armchair | $2275.00 | 19 | 07/17 10:02 |
| OA Offers: Four Barley Twist Chairs | $218.00 | 10 | 07/20 09:58 |
| OA Offers: Italian Deco Bedroom Suite | $2095.00 | 3 | 07/20 09:36 |
| STAINED GLASS WINDOWS (15 MATCHED) | $350.00 | 18 | 07/17 08:47 |
| CLASSIC "ZIG-ZAG" RIETVELD SIDE CHAIR | $305.00 | 15 | 07/16 22:30 |
| CLASSIC "RED AND BLUE" RIETVELD LOUNGE CHAIR | $305.00 | 9 | 07/16 22:22 |
| MAHOGANY SADDLE SEAT VANITY BENCH | $81.00 | 12 | 07/16 20:09 |
| PAIR MAHOGANY HEPPLEWHITE STANDS | $305.00 | 3 | 07/16 20:06 |
| UNUSUAL OAK PLANT STAND - VERY FANCY | $81.00 | 10 | 07/16 20:03 |
| SUPER VICTORIAN WALNUT MARBLE TOP TABLE | $709.00 | 13 | 07/16 19:54 |
| MAHOGANY MARTHA WASHINGTON SEWING STAND | $225.00 | 10 | 07/16 19:51 |
| FANCY OAK DESK CHAIR | $152.50 | 12 | 07/16 19:45 |
| WALNUT 1 DRAWER BEDSTANF 1930'S | $102.50 | 20 | 07/16 19:40 |
| MAHOGANY TILT TOP INLAID STAND | $65.00 | 14 | 07/16 19:36 |
| MAHOGANY BANDED INLAID HEPPLEWHITE DESK | $355.00 | 12 | 07/16 19:33 |
| CHERRY STICK AND BALL PARLOR STAND | $28.00 | 3 | 07/16 19:29 |
| MAHOGANY KIDNEY LEATHER TOP COFFEE TABLE | $105.02 | 13 | 07/16 19:26 |
| OUTSTANDING PAIR MAHOGANY STANDS | $152.50 | 7 | 07/16 19:22 |
| FANCY WALNUT PARLOR STAND 1920'S | $130.50 | 5 | 07/16 19:18 |
| MAHOGANY GLASS DOOR BOOKCASE | $660.00 | 35 | 07/16 17:58 |
| RARE ENGLISH VICTORIAN OAK GRIFFIN HALL BENCH | $1500.00 | 14 | 07/16 17:50 |
| RARE! INLAID EDWARDIAN ROSEWOOD MUSIC CABINET | $825.00 | 6 | 07/16 16:28 |
| 1940's Federal Style w/ Inlaid Mah | $105.00 | - | 07/16 15:34 |
| 1800'S WALNUT 12 TIN 3 DRAWER DOVETAILED PIE SAFE | $2136.00 | 28 | 07/16 15:29 |
| 2 FINE FRENCH CARVED BERGERE CANED ARMCHAIRS | $262.57 | 7 | 07/19 13:40 |

FIG. 1F (Prior Art)

| | | | |
|---|---|---|---|
| SUPERB FRENCH MARBLE TOP DESK BRONZE ORMOLU | $305.00 | 12 | 07/19 13:32 |
| SUPERB FRENCH PAINT DECORATED ARMOIRE MUST SEE | $540.00 | 10 | 07/19 13:26 |
| NICE!! CLAW FOOTED MAHOGANY DINING ROOM TABLE | $177.50 | 12 | 07/19 12:26 |
| KILLER 10FT CONFERENCE/DINING TABLE CLAW FEET | $725.00 | 15 | 07/19 11:22 |
| EARLY FRENCH MINI BUREAU | $710.00 | 15 | 07/16 07:37 |
| RARE CHILD'S OAK ROCKER, SAILING | $152.50 | 12 | 07/16 07:32 |
| ANTIQUE HEART PINE VICTORIA TRESTLE TABLE | $2300.00 | - | 07/19 04:56 |
| Walnut Victorian Dresser w/ marble / crvd pulls | $801.96 | 12 | 07/15 20:16 |
| OUTSTANDING SECRETARY DESK 19CEN LEATHER TOP | $1589.00 | 34 | 07/15 18:07 |
| FLAMBE MAHOGANY 4 PC. BEDROOM SUITE | $1625.00 | 20 | 07/15 17:05 |
| Rare Wicker Victorian Photographer's Chair | $310.00 | 6 | 07/18 16:13 |
| SHAKER LOW BACK DINING CHAIRS (SET OF 4) | $1500.00 | 30 | 07/18 14:07 |
| 10Pc. DREXEL COTTAGE BEDROOM SET - NO RESERVE | $995.00 | - | 07/18 06:22 |
| ANTIQUE HEART PINE VICTORIA TRESTLE TABLE w/ | $2300.00 | - | 07/18 06:05 |
| Long Case Clock - Jeremy Standing c1750 "PICs" | $40000.00 | - | 07/18 00:22 |
| EARLY 1800'S PERIOD WINDSOR CHAIR NICE!!!!!! | $260.00 | 15 | 07/17 18:45 |
| KILLER AMERICAN OAK GOTHIC CARVED PODIUM | $318.00 | 7 | 07/17 18:38 |
| KILLER AMERICAN OAK RAISED PANEL FILE CABINET | $1525.00 | 28 | 07/17 18:15 |
| SUPERB AMERICAN CHIPPENDALE MAHOGANY SIDEBOARD | $725.00 | 14 | 07/17 18:05 |
| ORNATE EUROPEAN CARVED 16TH CENT. STYLE DESK | $5000.00 | - | 07/17 11:09 |
| PAT. 1896 NATIONAL BRASS CASH REGISTER #47 | $510.00 | 19 | 07/16 17:36 |
| ULTRA RARE OAK ROYAL SOCIETY SPOOL CABINET | $365.00 | 8 | 07/16 17:09 |
| WALNUT 1860'S VICTORIAN MARBLE TOP SIDEBOARD | $530.00 | 14 | 07/16 16:34 |
| circa 1880 Floor Model Coffee Mill, Woodruff & | $825.00 | - | 07/15 20:29 |
| KILLER SET OF 6 OAK CLAW FOOTED T-BACK CHAIRS | $1250.00 | 36 | 07/15 17:29 |

FIG. 1G (Prior Art)

| All Items in Furniture |
|---|
| Current Auctions |

For more items in this category, click these pages:
= 1 = 2 3 4 5 6 ... 20 ... 36 (next page)

| Item | Price | Bids | Ends PDT |
|---|---|---|---|
| MAGNIFICENT EGYTIAN DINING ENSEMBLE | $5000.00 | - | 07/26 16:55 |
| Majorelle Armoire | $8000.00 | - | 07/26 16:51 |
| Old Brass Ornamental Griffin Fireplace Fan | $9.99 | - | 07/23 16:51 |
| OLD HAND CRAFTED DOLL'S WARDROBE!! | $25.00 | - | 07/23 16:43 |
| MASSIVE CLAWFOOT OAK LAMP TABLE | $385.00 | - | 07/23 16:42 |
| OLD HEREKE PERSIAN Oriental Rug NiceRugs | $400.00 | - | 07/26 16:30 |
| An Encyclopedia od Desks By Mark Bridge 1988 | $9.50 | - | 07/23 16:29 |
| VICTORIAN EBONIZED/GILT INCISED SEWING BENCH | $29.99 | - | 07/21 16:29 |
| Furniture Refinishing: The Furniture Doctor | $5.00 | - | 07/23 15:58 |
| Mahogany Round Tea Table | $140.00 | - | 07/23 15:41 |
| French Style Desk | $290.00 | - | 07/26 15:32 |
| Armoire | $1500.00 | - | 07/26 15:30 |
| 1860's MAHOGANY CHEST OF DRAWS | $100.00 | - | 07/23 15:29 |
| *19thC. MAHOGANY FLAMBE 1 DRAWER STAND/TABLE* | $49.99 | - | 07/21 15:26 |
| Duncan Phyfe Pair of Lyre Mahogany Drum Table | $295.00 | - | 07/23 15:24 |
| Louis XVI Mahogany Bedroom Suit Antique | $595.00 | - | 07/23 15:10 |
| Officer's Folding Canopied Bed 1850's NICE | $250.00 | - | 07/26 15:08 |
| Glass Floor Protectors for Furniture | $3.00 | - | 07/23 15:03 |
| Antique Oak Office Chair | $25.00 | - | 07/26 15:02 |
| Old Old Victorian Sand with engravings NEAT | $20.00 | - | 07/19 14:58 |
| Duncan Phyfe Mahogany Antique Sofa | $295.00 | - | 07/23 14:56 |
| STUNNING FRENCH ARMOIRE | $99.99 | - | 07/23 14:52 |
| Duncan Phyfe Mahogany Living Room Suit | $295.00 | - | 07/23 14:48 |
| Oak Rolltop Desk | $900.00 | - | 07/26 14:47 |
| * Leather Couches * tan double pillow | $100.00 | - | 07/26 14:47 |
| Duncan Phyfe Mahogany Dining Table Antique | $100.00 | - | 07/23 14:36 |
| Duncan Phyfe Mahogany Barrel Chair Antique | $75.00 | - | 07/23 14:33 |

FIG. 1H (Prior Art)

| | | | |
|---|---|---|---|
| Antique Brass Mantle Lamp/Picture Light, Mint | $99.00 | - | 07/25 08:14 |
| DESK & CHAIR SET *QUEEN ANN** AMAZING VALUE** | $177.50 | 2 | 07/22 07:14 |
| CHERRY NIGHTSTAND *QUEEN ANN*WITH LAMP*UNIQUE | $152.50 | 6 | 07/21 21:51 |
| Duncan Phyfe Oval Mahogany Coffee Table | $152.50 | 9 | 07/21 21:38 |
| 2 BAR STOOLS - COUNTER STOOLS *SWIVEL SEAT* L@@K | $100.00 | - | 07/21 21:26 |
| JELLJFF BOOK - GREAT REF BOOK - OUT OF PRINT | $680.00 | 11 | 07/24 19:56 |
| American Furniture 19th Century - Belter Book | $250.00 | - | 07/21 19:52 |
| Country French Mahogany Pair Antique Chairs | $51.00 | 2 | 07/21 19:40 |
| JEWELRY ARMOIRE *HAND PAINTED*FLOWERS*QUEEN AN | $1725.00 | 26 | 07/21 19:23 |
| JEWELRY ARMOIRE *QUEEN ANN* STORE DIAMONDS | $21.00 | 3 | 07/21 19:19 |
| Duncen Phyfc Leather Desk Mahogany Chair | $2700.00 | - | 07/21 19:14 |
| 3 NESTING TABLESCHERRYEMPIRE STYLE | $187.50 | 9 | 07/21 18:37 |
| Set of Antique Oak Bentwood & Cane Chairs | $86.00 | 4 | 07/21 18:37 |
| 3 NESTING TABLESQUEEN ANNCHERRY | $404.00 | 6 | 07/21 18:19 |
| CHERRY BENCH*TAPESTRY*UPHOLSTERED*GEORGEOUS! | $227.50 | 3 | 07/21 18:17 |
| Hepplewhite / Duncan Phyfc Mahogany Desk | $635.00 | 7 | 07/21 16:49 |
| CHERRY SOFA TABLEQUEEN ANNALL WOOD** | $45.00 | 8 | 07/21 15:23 |
| COAT RACK *SOLID WOOD * ROTATES * GEORGEOUS | $695.00 | 2 | 07/24 15:20 |
| Duncan Phyfe Mahogany Antique China Cabinet | $102.50 | 12 | 07/24 15:15 |
| HALL CONSOLE & MIRRORQUEEN ANNCHERRY | $50.00 | 1 | 07/21 15:01 |
| CHERRY BENCH**TAPESTRY UPHOLESTRY*GEORGEOUS | $61.00 | 4 | 07/21 14:29 |
| Quees Anne Antique Mahogany Chair | $455.00 | 12 | 07/24 13:39 |
| CEDAR BLANKET CHEST CHERRY FINIAHBEDSIDE | $100.00 | 1 | 07/21 13:34 |

For more items in this category, click these pages:
= 1 = 2 3 4 5 6 ... 20 ... 36 (next page)
Top : Antiques : Furniture

FIG. 1I

Click on a title to get a description and to bid on that item. A red ending time indicates that an auction is ending in less than five hours. This page is updated regularly; don't forget to use your brower's reload or refresh button for the most recent update of the page. The system may be unavailable during regularly scheduled maintenance - Please note the new regularly scheduled maintenance time is Fridays, 12 a.m. to 4a.m. Pacific Time (Fridays, 0:00 a.m. to 04:00 a.m., eBey time)

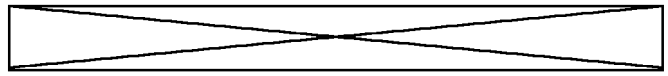

Member of Inerweb Link Exchange

   Home  Listings  Buyers  Sellers  Search  Help  News/Chat  Site Map

Thank you for using eBey!

About eBey | SafeHarbour

*Copyright © 1995-1999 eBey Inc. All Rights Reserved.*
All trademarks and brands are the property of their respective owners.
Use of this web site constitutes acceptance of the eBey User Agreement and Privacy Policy.

FIG. 1J (Prior Art)

Home  Listings  Buyers  Sellers  Search  Help  News/Chat  Site Map

Subscribe now! Get your charter subscription to eBey magazine.
Give us your comments! Test drive the new, revised site.
Free escrow! Buy and sell safely with eye-Escrow.

| SUPER TURN OF THE CENTURY OAK VICTORIAN SECRETARY |
| --- |
| Item #131862095 |

Antiques:Furniture

Description

| | Currently | $899.00 (reserve met) | First bid | $99.99 |
| --- | --- | --- | --- | --- |
| | Quantity | 1 | # of bids | 16 (bid history) (with emails) |
| | Time left | 9 days, 0 hours+ | Location | CANFIELD, OHIO |
| | Started | 07/14/99, 19:56:34 PDT | | (mail this auction to a friend) |
| | Ends | 07/24/99, 19:56:34 PDT | | (request a gift alert) |
| | | | | Featured Category Auction |

Bid

Seller    suellen10 (843) ★
         (view comments in seller's Feedback Profile) (view seller's other auctions)
         (ask seller a question)

High bid  horner2 (1)

Payment   Visa/MasterCard, Money Order/Cashiers Checks, Personal Checks, See
          item description for payment methods accepted Shipping  Seller ships Internationally, See item description for shipping charges Seller assumes all responsibility for listing this item. You should contact the seller to resolve any questions before bidding. Currency is dollar ($) unless otherwise noted.

| Description |
| --- |

Reeded posts supporting shelves, stick and ball galleries, carved gingerberad, beading, ornate brass hardware, beveled mirror and original finish are the first phrases that come to mind when I think about describing this oak secretary which is truly a show stopper. The drawers are all mortised (I think that's the correct word) and the two lower drawers lock with the same key as the drop front on the desk. The secretary is 67 1/2" tall, 30" wide and 14 3/8" deep. I was told by an auctioneer friend that this piece could have been made in Sheboygan. As with all things beautiful and old, it comes with some concerns and they would be, the shelf over the top drawer and the very bottom center shelf have lost a portion of the finish, there is a 2 inch section of beading missing from the left side, below the right hand door there is a small section of wood missing from which 1" square, slight silver loss on beveled mirror, 3 "filigree" brackets are missing from the pogeon holes, 2 pieces of trim are missing from the underside of the bottom shelf where the shelf meets the legs and the old boards on the back are loose. The finials on the top need tightened down and several pieces of trim need to be reglued. You will find a couple of scratches and a ring inside one of the doors. The secretary needs a good cleaning and polishing also. I have tried to be very accurate listing any problems and hope I haven't missed anything. None of the above are critical concerns and the missing pieces can be replicated by a craftsman. Do not let these concerns prevent you from owning one of the finest secretary's I have ever seen. I can promise you that even the most modest new secretary made of pressed sawdust

FIG. 1K (Prior Art)

would cost you more than the reserve on this item. This item is out of an Estate in Euclid, Ohio. The woman was born in 1913. She was born of Swedish immigrant parents. Her estate contained many worderful and very unique items. Please email any questions before bidding. Suellen10 has been selected as a Bronze Power Seller. Satisfaction guaranteed on any items sold that do not meet the item description. Item may be returned within 30 days of the auction end with prior approval by this seller. (This does not include buyer's remorces.) Buyer responsible for making arrangements for pickup and shipping and payment of all shipping charges. Payment for secretary is due in 7 days. MasterCard, Visa, Money Orders and Certified Checks ship next business day. Personal checks ship after check has cleared bank (10-14 days). Ohio buyers add 5.5% sales tax.

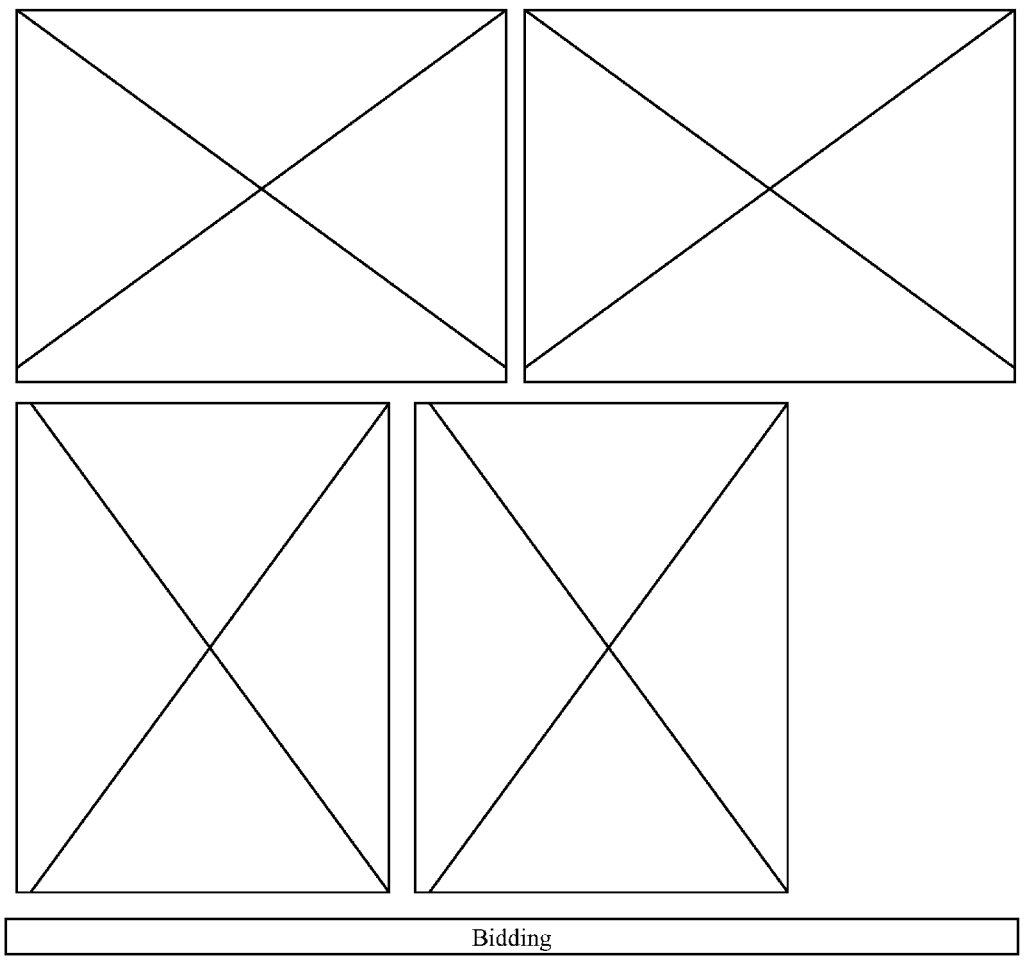

Bidding

SUPER TURN OF THE CENTURY OAK VICTORIAN SECRETARY (Item #131862095)

FIG. 1L (Prior Art)

| | |
|---|---|
| Current bid | $899.00 |
| Bid Increment | $10.00 |
| Minimum bid | $909.00 |

Registration required. eBey requires registration in order to bid. Find out how to <u>become a registered user</u>. It's fast and it's free!

> To finalize your bid, you will need to submit your User ID and Password in the next step. You will not be asked to enter your User ID and Passwrod anywhere on this page.
>
> [            ]  *Current minimum bid is $909.00*  [ Preview bid ]
>
> Your maximum bid.
>
> Please type only numerals and the decimal symbol (.) if required. Do not include currency symbols such as $.
> Binding contract.
>   Placing a bid is a binding contract in many states. Do not bid unless you intend to buy this item at the amount of your bid.
>
> Binding contract.
>   Please bid the maximum amout you are willing to pay for this ite,. Your maximum amount will be kept secret; eBey will bid on your behalf as necessary by increasing your bid by the current bid increment up until your maximum is reached. This saves you the trouble of having to keep track of the auction as it proceeds and prevents you from being outbid at the last minute unless your spending limit is exceeded (See an example of proxy bidding). Also, in case of a tie for the high bidder, earlier bids take precedence. And, keep in mind that you cannot reduce your maximum bid at a later date. Unless otherwise noted, bids are in U.S. dolaars.
>   If you have bid on this item before, note that your new bid must be greater than your previous bid

   Home  Listings  Buyers  Sellers  Search  Help  News/Chat  Site Map

Thank you for using eBey!

About eBey | SafeHarbour

*Copyright © 1995-1999 eBey Inc. All Rights Reserved.*
All trademarks and brands are the property of their respective owners.
Use of this web site constitutes acceptance of the eBey <u>User Agreement</u> and <u>Privacy Policy</u>.

FIG. 1M (Prior Art)

 Home Listings Buyers Sellers Search Help News/Chat Site Map

The Latest Buzz. Check out what's new at eBey!

2 items found for the search "bedroom furniture". Showing items 1 to 2.

| bedroom furniture | Go! | email on new items with personal SHOPPER |
|---|---|---|

*e.g. "brown bear" -teddy* more tips

*Results by:* TIGERTOWN

Sort by: Ending Date ▼
○ ascending
○ descending
☐ Search Descriptions

Search Completed Items

| Search Results |
|---|
| Current Auctions |

12:24:36 PDT

| Item# | Item | Price | Bids | Ends PDT |
|---|---|---|---|---|
| 129218778 | Simmons Steel Bedroom Furniture 1930's | $650.00 | 0 | 07/19 10:55 |
| 131655138 | ANTIQUE BEDROOM FURNITURE SET | $300.00 | 0 | 07/24 14:12 |

Items 1 to 2 maatching the query "bedroom furniture."
*Note:* Bid counts and amounts may be slightly out of date.
Click on the specific item(s) you are interested in for up-to-date information.

go to TOP of page

Page 1 of 1

 Home Listings Buyers Sellers Search Help News/Chat Site Map

Thank you for using eBey!

About eBey | SafeHarbour

*Copyright © 1995-1999 eBey Inc. All Rights Reserved.*
Use of this site constitutes acceptance of eBey's Terms and Conditions.
Last Modified: 1999-07-16 12:25:00

FIG. 1N (Prior Art)

 Home  Listings  Buyers  Sellers  Search  Help  News/Chat  Site Map

The Latest Buzz. Check out what's new at eBey!

2 items found for the search "bedroom furniture". Showing items 1 to 2.

| bedroom furniture | Go! | *email on new items with* personal SHOPPER | | *Results by:* TIGERTOWN |

*e.g. "brown bear" -teddy* more tips

Sort by: [Ending Date ▼]  ○ ascending  ○ descending   ☐ Search Descriptions   Search Completed Items

| Search Results |
| Current Auctions |

18:51:30 PDT

| Item# | Item | Price | Bids | Ends PDT |
|---|---|---|---|---|
| 128242887 | Doll House Furniture-Old-5/ Bedroom Plastic PIC! | $4.00 | 1 | 07/17 10:52 |
| 128657959 | Doll Furniture (Bedroom Set) PIC! | $225.00 | 0 | 07/18 06:52 |
| 131112630 | METAL FURNITURE FOR BEDROOM, 4 PC, MATTEL, NR PIC! | $8.00 | 0 | 07/18 13:01 |
| 130097213 | Doll Furniture Wooden Bedroom PIC! | $4.95 | 0 | 07/18 13:23 |
| 130284209 | Barbie Stacie Bedroom Dollhouse Furniture set PIC! | $10.50 | 4 | 07/18 18:15 |
| 130388698 | Lundby Dollhouse Furniture Pink Bedroom #9714 PIC! | $10.00 | 2 | 07/18 20:14 |
| 132397060 | Matching Bedroom Furniture- 5 Piece Set PIC! | $400.00 | 0 | 07/18 21:04 |
| 131442141 | Hand Crafting Bedroom Furniture in Miniature PIC! | $3.00 | 0 | 07/18 22:36 |
| 130565392 | Antique Dollhouse Furniture! Bath & Bedroom | $18.00 | 4 | 07/19 10:35 |
| 129218778 | Simmons Steel Bedroom Furniture 1930's PIC! | $650.00 | 0 | 07/19 10:55 |
| 130716531 | Renwal Dollhouse Furniture Bedroom Highboy PIC! | $4.99 | 0 | 07/19 16:53 |
| 130716531 | Tootsietoy Doll Furniture Bedroom BOX PIC! | $25.55 | 2 | 07/19 18:36 |
| 129408545 | DOLLHOUSE BEDROOM FURNITURE PIC! | $20.00 | 1 | 07/19 18:40 |
| 130860097 | Strawberry Shortcake Bedroom Furniture - NR | $5.00 | 0 | 07/19 20:08 |
| 129537655 | Mini Baby Bedroom Furniture, 5 pieces - PIC PIC! | $19.95 | 1 | 07/20 00:54 |
| 131895202 | 4 PIECES OF BEDROOM FURNITURE PIC! | $8.50 | 1 | 07/21 20:44 |
| 132098313 | Marx Doll House Furniture 8 pc. Bedroom Set PIC! | $9.99 | 0 | 07/22 12:18 |

FIG. 10 (Prior Art)

OOYAH!Auctions

OoYah! - Account Info - Help

Welcome, guest
OoYah! Auctions

Submit Item - My Auctions - Options - Sign In
It's Free!

Getting Started
- Bidder Guide
- Seller Guide
- Community

You are not signed in
You must sign in to bid or sell

OoYah! ID: [        ]
OoYah! Password: [        ]
☐ Remeber my ID & Pword

[ Sign In ]

New User?
Sign Up Here

Charity Auctions
TRAINN Charity Auction

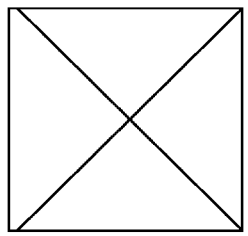

Bid on Sori Amot autografd
Stephe Madden Shoes

Other Charity Auctions

Fun Charity

Sports Charity TICKETS!

Sports Charity Challenge!

About Charity Auctions

Find Auctions

[          ] [Search] [all auctions ▼]
Options

Antiques & Collectibles (82,482)
Numismatics, Porceline, Memorabelia...

Arts & Entertainment (66,816)
Books, Music, Movies...

Business & Office (803)
Furniture, Fax Machines, Briefcases & Bags...

Clothing & Accessories (2,781)
Jewelry, Womens...

Computers (29,788)
Hardware, Software, Domain Names...

Electronics & Cameras (6,839)
Audio, Video, Cameras & Equipment...

Home & Garden (12,635)
Housewares, Baby Items, Furnishings...

Sports & Recreation (27,203)
Golf, Skiing & Snowboarding, Hobbies & Crafts...

Toys & Games (116,829)
Video Games, Furby, Beanie Babies...

Trading Cards (94,001)
Baseball, Football, Games@...

Other Goods & Services (12,691)
Services, Flowers...

Full Category Index...

FIG. 2A
(Prior Art)

OOYAH!Auctions

OoYah! - Customize - Help - Sign In
Submit Auctions - Submit to this Category

OoYah! Auctions

Auctions > Antiques & Collectibles

Auction Services
- My Auctions
- Bidder Guide
- Seller Guide
- Community

Community
- Antique Collectors
- Antique Dealers Forum
- Auctions Msg. Boards

Guides
- Kovel's Price Guide
- The Antique Shop

Search Auctions

[          ]  Search  [all auctions ▼]
Options

Browse Auctions

Advertising (3,586)
  Beverage Related, Gasoline@, Cereal Boxes...

Appliances (334)
  Radios, Toasters, Typewriters...

Art (6,304)
  Animation, Paintings, Photo Images...

Autographs (5,780)

Books@(26,465)
  Bestsellers, Children's, College Textbooks...

Cultures & Groups (1,240)
  Girl Scouts, Black Americana...

Disneyana (3,472)
  Video Tapes@, Bean Bags@...

Furniture (665)
  Tapestries@, Chairs, Rugs &...

Glass (4,492)
  Crystal, Swarkoski, Dpresion...

Holiday & Seasonal (1,438)
  Fourth of July, Halloween, Thanksgiving...

Kitchenware (1,796)
  Spoons, S&P Shakers, Tins...

Memorabilia (880)
  Rock and Roll, Sports@, Royalty@...

Militaria (2,143)
  Civil War, WW II, Canada...

Miscellaneous (7,400)
  Buttons@, Thimbles@, Piggy Banks...

Numismatics (9,241)
  Coins, Currency, Supplies...

Porcelain (6,556)
  China, Collector Plates, Minis & Figurines...

Pottery (2,153)
  McCoy, Roseville, Hammersley...

Science & Nature (346)
  Bones & Fossils, Rocks & Mnrls, Sea Shells...

Science Fiction (1,071)
  Star Wars, Star Trek, X-Files...

Stamps (1,107)
  United States, World, Canada...

Toys & Games (101,153)
  Video Games, Furby, Beanies...

Transportation (1,536)
  Automobilia, Bicycles, Tractors...

*Copyright © 1994-1999; OoYah! Inc. All Rights Reserved.*
Privacy Policy - Terms of Service - Guidelines - Help

FIG. 2B
(Prior Art)

OOYAH!Auctions

OoYah! - Account Info - Help

Welcome, guest
OoYah! Auctions

Submit Item - My Auctions - Options - Sign In
It's Free!

Auctions > Antiques & Collectibles > Furniture

Getting Started
- Bidder Guide
- Seller Guide
- Community

You are not signed in
You must sign in to bid or sell

OoYah! ID: [        ]

OoYah! Password: [        ]
☐ Remeber my ID & Pword

[ Sign In ]

New User?
Sign Up Here

Community
- Antique Collectors
- Antique Dealers Forum
- Auctions Msg. Boards

Guides
- Kovel's Price Guide
- The Antique Shop

Find Auctions

[                    ] [ Search ] Options

All (827)                      Dressers (33)

Armoires (8)                   Kitchen Sets (15)

Bedroom Sets (19)              Living Room Sets (23)

Beds (12)                      Love Seats (4)

Bookcases (827)                Patio Sets (8)

Chairs (47)                    Rugs & Carpets@ (196)

Chests (36)                    Sofas (16)

Desks (15)                     Tables (41)

Dining Room Sets (9)           Tapestries (140)

Other (209)

---

*Copyright © 1994-1999; OoYah! Inc. All Rights Reserved.*
Privacy Policy - Terms of Service - Guidelines - Help

FIG. 2C
(Prior Art)

OOYAH!Auctions

OoYah! - Customize - Help - Sign In

Welcome, guest                    Submit Item - My Auctions - Options - Sign In

| OoYah! Auctions | Auction Home |
|---|---:|

Auctions > Antiques & Collectibles > Furniture > Living Room Sets

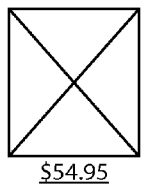 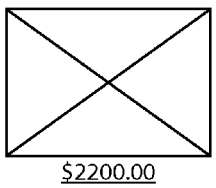 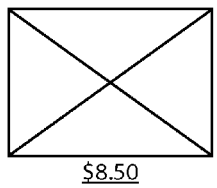 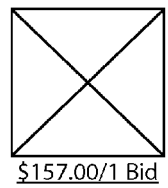 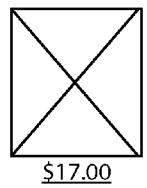

| $54.95 | $2200.00 | $8.50 | $157.00/1 Bid | $17.00 |

Showing 1 of 1 pages (16 items total)    [Show only photos]    Previos 50 | Next 50

| Photo | Title | Current Bid | Bids ▲ | Time Left |
|---|---|---|---|---|
| 📷 | Beautiful Wall Hangings * Great Decoration in Room * | $29.95 | - | 13 hrs |
| 📷 | 2-P-Set Beautiful Wall Hangings * Great Decor in Room * | $54.95 | - | 18 hrs |
| 📷 | Italian 18 century antique sofa and side chairs | $2200.00 | - | 22 hrs |
| 📷 | A circle of Soapstone Elephants! NR | $8.50 | - | 1 day |
| 📷 | Grandfather Clock 6 foot Don't miss this offer! | $157.00 | 1 | 1 day |
| 📷 | Classic Caniz Candleholder! Beautiful! NR | $17.00 | - | 2 days |
| 📷 | Beautiful Lacquered Cork Sculptures Screen * Great Decoration in Your Room * | $45.95 | - | 2 days |
|  | Gold leaf dining set | $500.00 | - | 2 days |
| 📷 | Large Sofa Never Used | $50.00 | - | 3 days |
| 📷 | Blue Faux Suede Inflatable Livingroom Suite | $350.00 | - | 3 days |
| 📷 | Grandfather Clock - 31 day clock! (New) | $177.00 | - | 3 days |
| 📷 | 1942 Penny Gumball Machine nEW! | $93.25 | - | 6 days |
| 📷 | Handsome Dome-topped Rattan Chest w/ Metal Frame! NR | $26.00 | - | 6 days |
| 📷 | Black Queen Size Futon/Bed frame with matress | $175.00 | - | 8 days |
| 📷 | Bamboo 17 piece living room set | $1250.00 | - | 8 days |
| 📷 | A very nice set to have for your living room | $29.99 | - | 9 days |

Showing 1 of 1 pages (16 items total)    [Show only photos]    Previos 50 | Next 50

Alert me - Email/alert me when new items appear in thes category. (View Alerts)

[       ] [Search] Options

Copyright © 1994-1999; OoYah! Inc. All Rights Reserved.
Privacy Policy - Terms of Service - Guidelines - Help

FIG. 2D
(Prior Art)

OOYAH!Auctions

OoYah! - Customize - Help - Sign In

Welcome, guest                         Submit Item - My Auctions - Options - Sign In

| OoYah! Auctions | Auction Home |
|---|---|

Auctions > Antiques & Collectibles > Furniture > Armoires

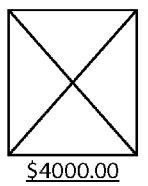 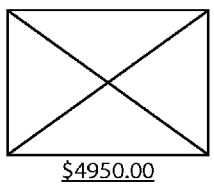 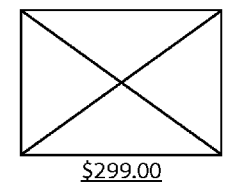 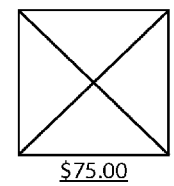 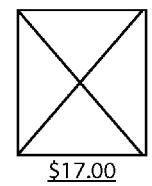

$4000.00       $4950.00        $299.00         $75.00          $17.00

Showing 1 of 1 pages (12 items total)    [Show only photos]    Previos 50 | Next 50

| Photo | Title | Current Bid | Bids ▲ | Time Left |
|---|---|---|---|---|
| 📷 | 19th Century Armoire, Primitive | $450.00 | - | 20 hrs |
| 📷 | Mahogany Veneer Armoire, 1930s | $525.00 | - | 20 hrs |
| 📷 | Country Coffee Table - White! | $99.00 | - | 1 day |
| 📷 | Lovely White Country Cabinet | $150.00 | 1 | 1 day |
| 📷 | 1865 Rosewood - Mahogany Wardrobe / Armoire | $4000.00 | - | 2 days |
| 📷 | Javanese Teak Cabinet | $400.00 | 1 | 3 days |
| 📷 | Small Javanese Carrying Chest | $100.00 | - | 3 days |
| 📷 | Antique Reproduction Solid Mahogany Dove Armoir . Free Shipping | $4950.00 | - | 3 days |
|  | Entertainment Armoire | $299.00 | - | 3 days |
| 📷 | Miniature Oak Roll Top desk - Jewelry Case | $75.00 | - | 4 days |
| 📷 | Classic Capiz Candleholder! Beautiful! NR | $17.00 | - | 4 days |
|  | very large armoire | $3000.00 | - | 5 days |

Showing 1 of 1 pages (12 items total)    [Show only photos]    Previos 50 | Next 50

Alert me - Email/alert me when new items appear in thes category. (View Alerts)

[        ] Search  Options

*Copyright © 1994-1999; OoYah! Inc. All Rights Reserved.*
*Privacy Policy - Terms of Service - Guidelines - Help*

FIG. 2E
(Prior Art)

ooYah!Auctions

OoYah! - Customize - Help - Sign In

Welcome, guest                    Submit Item - My Auctions - Options - Sign In

OoYah! Auctions                                    Auction Home

Auctions > Antiques & Collectibles > Furniture > Chests

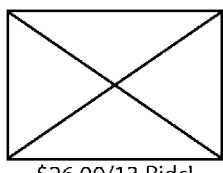 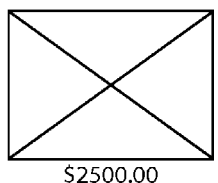 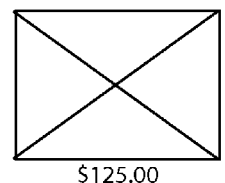 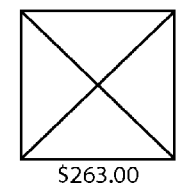 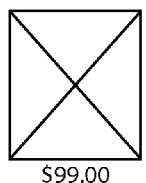

| $26.00/13 Bids! | $2500.00 | $125.00 | $263.00 | $99.00 |

Showing 1 of 1 pages (33 items total)  [Show only photos]  Previos 50 | Next 50

| Photo | Title | Current Bid | Bids ▲ | Time Left |
|---|---|---|---|---|
| 📷 | RATTAN CHEST... | $35.00 | - | 21 hrs |
| 📷 | Beautiful Antique Finish Trinket Box... New!!! | $8.00 | - | 21 hrs |
| 📷 | Dome Top Small Child's Doll Trunk | $26.00 | 13 | 1 day |
| 📷 | Ca. 1900 carved solid oak Victorian Buffet - ANTIQUE | $2500.00 | - | 2 days |
| 📷 | Correspondence storage Rattan Chest | $24.95 | - | 2 days |
| 📷 | French Reproduction CURIO CABINET W/ solid Bronze Trimmings - NO RESERVE!!! | $399.00 | - | 3 days |
| 📷 | French Reproduction Commode / Credenza W/ solid Bronze Trimmings And Marble Top | $449.95 | - | 3 days |
| 📷 | Rooster Cabinet - no Reserve | $125.00 | - | 4 days |
| 📷 | Oriental Hop Chest - Hand Carved - Medium - Dark Finish | $165.00 | - | 4 days |
| 📷 | Oriental Hop Chest - Hand Carved - XLarge - Dark Finish | $265.00 | - | 4 days |
| 📷 | Oriental Hop Chest - Hand Carved - XLarge - Dark Finish | $265.00 | - | 4 days |
| 📷 | Shin's Hope Chest - Hand Carved - Small - Light Finish | $99.00 | - | 4 days |
| 📷 | Dolphin Hope Chest - Hand Carved - Small - Light Finish | $125.00 | - | 4 days |
| 📷 | Islander Hope Chest - Hand Carved - XLarge - Dark Finish | $250.00 | - | 4 days |
| 📷 | Dolphin End Table Chest - Hand Carved - Light Finish | $99.00 | - | 4 days |
| 📷 | Antique Buffet | $800.00 | 1 | 4 days |
| 📷 | Early painted wood box - NICE - Bride Box | $50.00 | - | 5 days |
| 📷 | CIRCA - 1850 Min. Four Drawer CHEST Mahog. & Pine | $80.00 | - | 5 days |
| 📷 | Egyptian inlaid tool chest GM104 | $1886.00 | - | 5 days |
| 📷 | Egyptian Curio Cabinet w/ back Mirror 1F455 | $1617.00 | 8 | 6 days |
| 📷 | Antique Metal Treasure Chest | $6.20 | - | 6 days |
| 📷 | Egyptian Curio Cabinet w/ back Mirror MH356 | $1940.00 | - | 6 days |
| 📷 | Egyptian Boulle Mobile Marble Tan MH 371 | $1940.00 | - | 6 days |

FIG. 2F (Prior Art)

| | | | | |
|---|---|---|---|---|
|  | Georgeous Inlaid Moble from Egypt MIDO200 | $1617.00 | - | 6 days |
|  | Beautiful Inlaid Top Moble from Egypt MIDO203 | $1886.00 | - | 6 days |
|  | Beautiful! Curio Cabinet back mirror MIDO337 | $1751.00 | - | 6 days |
|  | Exquisite Curio Cabinet from Egypt MIDO340 | $1886.50 | - | 6 days |
|  | Finely detailed Curio Cabinet from Egypt MIDO342 | $2048.00 | - | 6 days |
|  | Circa 1668-1813 Four drawer chest WL807 | $1617.00 | - | 6 days |
|  | Dome-top Rattan Chest... | $28.00 | - | 7 days |
| | Lighthouse Trinket Box...New Item! | $2.50 | - | 9 days |
|  | Rennaissance Angel Wood Trinket Box ... Hot Item... | $9.95 | - | 12 days |
|  | *** Dome-Topped Rattan Chest *** | $33.00 | - | 13 days |

Showing 1 of 1 pages (33 items total)   [Show only photos]   Previos 50 | Next 50

Alert me - Email/alert me when new items appear in thes category. (View Alerts)

[        ] Search  Options

*Copyright © 1994-1999; OoYah! Inc. All Rights Reserved.*
Privacy Policy - Terms of Service - Guidelines - Help

FIG. 2G (Prior Art)

OOYAH!Auctions

OoYah! - Customize - Help - Sign In

Welcome, guest                    Submit Item - My Auctions - Options - Sign In

| OoYah! Auctions | Auction Home |

Auctions > Antiques & Collectibles > Furniture > Chests

Dragon Hope Chest - Hand Carved - XLarge Dark Finish     [Add to Watchlist]

| Seller (rating): | gtiliane (9) | Time Left: | 4 days (Countdown Ticker) | To place a bid, first sign in: |
| Location: | Seaside, OR | | | (Get your own OoYah! ID) |
| # of Items: | 1 | # of Bids: | 0 Bid History | OoYah! ID: |
| Item ID #: | 4751312 | Current Bid: | $265.00 | |
| | | High Bidder: | | OoYah! Password: |

☐ Remeber my ID & Pword

Sign In

Need help signing in?

| Item Information | Bid History | Question & Answer |

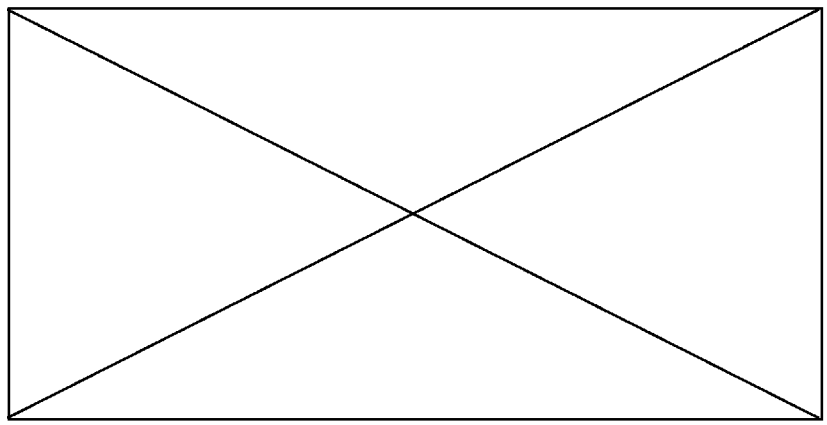

Extra large hand carved hope chest. Size 40" length, 21" depth, 24" height. Beautifully hand carved in wood (Camphor wood inside, Robin wood outside). Design is far east, good fortune dragons. Hand carved top on all 4 sides. Add a glass top and use as a coffee or end table, or makes a wonderful business or home entry table! Not antique. Buyer pays shipping. Total shipping is $65.00 (crated, insured, and delivered to your door by u.p.s.). I also have a new tempered glass top for this chest at FIG. 2H (Prior Art)

a fixed price of $55.00 with no additional shipping charges for the glass top. A lock and key is included with your bid!

Seller Info

Seller (rating): <u>gtiliane (9)</u>

Payment Types Accepted
- Accepts Personal Checks
- Accepts Cashiers Checks and Money Orders
- Accepts Credit Cards

Shipping Info
- Buyer Pays Shipping
- Seller Ships on Payment

<u>Seller's Other Auctions</u>

<u>Comments About Seller</u>

<u>Ask Seller a Question</u>

Auction Info

| | |
|---|---|
| Current Bid: | $265.00 |
| Time Left: | 4 days |
| High Bidder: | |
| # of Items: | 1 |
| # of Bids: | 0 |
| Started at: | $265.00 |
| Bid Increment: | 5.00 |
| Opened: | Jun 29, 12:14 PDT |
| Closes: | Jul 6, 11:14 PDT |
| ID #: | 4751312 |

To place a bid, first sign in:
(<u>Get your own OoYah! ID</u>)

OoYah! ID: [ ]

OoYah! Password: [ ]

☐ Remeber my ID & Pword

[ Sign In ]

<u>Need help signing in?</u>

*Copyright © 1994-1999; OoYah! Inc. All Rights Reserved.*
<u>Privacy Policy</u> - <u>Terms of Service</u> - <u>Guidelines</u> - <u>Help</u>

FIG. 2I (Prior Art)

amaz*n*.com ⛟ | YOUR ACCOUNT | HELP

| WELCOME | BOOKS | MUSIC | VIDEO | TOYS & GAMES | ELECTRONICS | e-CARDS | AUCTIONS |

| AUCTION SEARCH | BROWSE CATEGORIES | GETTING STARTED | YOUR AUCTIONS | SELL YOUR ITEM NOW |

[_____] GO!

- Art & Antiques
- Books
- Ceramics, Pottery & Glass
- Clothing & Accessories
- Coins & Stamps Collectibles
- Comics, Cards & Science Fiction
- Computers & Software
- Electronics & Photography
- Gemstone & Jewelry
- Home & Garden
- Movies & Video
- Music
- Other Goods & Services
- Sports & Recreation
- Toys & Games
  > See all categories...

AMAZIN.COM AUCTIONS

Items Featured Today
*RARE* "Meet the Beatles" album cover Painted by PETER MAX
ANTIQUE GRAND PIANO 5'8"
Hummingbirds - SPUN GLASS & PORCELAIN *AWESOME *
 "REAL"  LAS VEGAS RESORT VACATION 4d/3n $109
VISUAL BASIC TRAINING, Utilities/tools, more
TACTICAL LOCKBACK KNIVES @ $2.99!! SUPER DEAL!! SPIDERCO STYLE!!

Sombody and Amazin.com Partnership

Bid at Live Auctions with LIVE/BID

What's Happening
Check out and browse through our newest categories
List all your auctions fast with the Bulk Loader
> See all happenings...

Hello, first time visitor.

New to Amazin.com Auctions? Click here to get started.

Browse for items.

Sell your items. It's easy.

Already a customer? Sign in.

Auctions Guarantee
Browse and bid with confidence. Check out our Amazin.com Auctions Guarantee

Top 5 Questions
1. How do I search?
2. How do I bid?
3. How do I sell?
4. Are there fees?
5. Why is it safe?

Last Updated: July 16, 1999 22:47:46 PST

Text Only                                                                                          Top of Page Amazin.com Home | Books | Music | Video | Toys & Games | Electronics | e-Cards |
Austions | I-Click | Settings | Shopping Cart | Your Account | Help Auction Search | Browse Categories | Getting Started | Your Account | Sell an Item Now Amazin.co.uk | Amazin.de Copyright and disclaimer © 1996-1999; Amazin.com, Inc.

Amazin.com Privacy Policy | Your Bill of Rights

FIG. 3A
(Prior Art)

| | | | | |
|---|---|---|---|---|
| 📷 | Pre-Classis Female Figurine - Valley of Mexico | $475.00 | 0 | 3 da 13:1 |
| | Gun Owners Rebellion, The Gov. doesn't want you to see this report | $5.00 | 0 | 3 da 16:3 |
| 📷 | Player Piano | $2,000.00 | 1 | |
| 📷 | ROMAN COIN - 270 AD, Jupiter Presentin a GLOBE!! TOP TOP QUALITY !! | $33.95 | 4 | |
| 📷 | RARE VICTORIAN ENGRAVING ON SATIN \|\| V. HUGO CHARACTERS : Esmeralda | $9.99 | 0 | |
| | WW2 NAVIGATIONAL WATCH | $2,500.00 | | |
| 📷 | SILVER Coin - 129 BC, Roman Republic - APOLLO in a FOUR HORSE CHARIOT !!! | $30.01 | 3 | |
| 📷 | CLASSIC 1941 COLUMBIA BICYCLE, AWESOME!! | $1,275.88 | 0 | |
| 📷 | Lilac Star Handcrafted Quilt and Sham | $15.50 | 1 | |
| 📷 | GREEK COIN - 320 BC Alexander the Great (His Face) !! SHARP !! | $27.95 | 0 | |
| 📷 | ATTENTION ANTIQUE CUN COLLECTORS | $6.95 | 0 | |
| 📷 | Statues - 1 Sculpt Roman Marble Deities | $400.00 | 0 | |
| | Custom made Oriental rug | $1,000.00 | 0 | 10 days 10:49:02 |
| 📷 | HUGE JADE 2-HEAD DRAGON BOAT (Below price) | $900.00 | 0 | 10 days 13:33:24 |
| 📷 | Amish Quilt! (K) Georgiouse! Come look... | $450.00 | 0 | 13 days 13:53:39 |

FIG. 3C (Prior Art)

Last Updated: July 16, 1999 22:47:46 PST

Text Only                                                                                                    Top of Page Amazin.com Home | Books | Music | Video | Gifts | e-Cards | Austions | I-Click | Shopping Cart
Your Account | Help Auction Search | Browse Categories | Getting Started | Your Auctions | Sell an Item Now Amazin.co.uk | Amazin.de Copyright and disclaimer © 1996-1999; Amazin.com, Inc.

FIG. 3D (Prior Art)

amazon.com

☕ | HELP
YOUR ACCOUNT

| WELCOME | BOOKS | MUSIC | VIDEO | TOYS & GAMES | ELECTRONICS | e-CARDS | AUCTIONS |

| AUCTION SEARCH | BROWSE CATEGORIES | GETTING STARTED | YOUR AUCTIONS | SELL YOUR ITEM NOW |

Auction Search: [_____] Go!    Browse: [All Categories ▼] Go!

22:31:06 PDT

Auctions / Antiques / Books & Manuscripts     Sell an item now in Books & Manuscripts

Full Results     Sort by: [End date ▼]
Items 1 to 50 of 464 are shown below. To see more results
scroll down and click the "More" button      ○ Ascending  ○ Descending  [Go!]

Show: Open | New | Closing Today | Closing in 5 hours | Closed

| Picture | Auction Name | Current Bid | Bids | Time Remaining |
|---|---|---|---|---|
|  | -- Robert Schumanny Song Cycles -- 1900 [?] A Rare Treasure | $99.00 | 0 | 0 days 01:00:13 |
| 🖼 | MAGNIFICIENT OLD PERSIAN RUG | $202.50 | 1 | 0 days 02:06:50 |
| 🖼 | Antiques "Oil & Gas Journal" (1930-1940) | $10.00 | 0 | 0 days 08:12:43 |
|  | Amy Vanderbilt Cookbook With Drawings by Andy Warhol | $75.00 | 1 | 0 days 01:00:13 |
|  | ST. NICHOLAS MAGAZINE PART 1 VOLUME X *1883* THE CENTURY CO | $139.95 | 1 | 0 days 01:00:13 |
|  | CASTE CLASS & RACE [OLIVER CROMWELL COX PHD 1948] | $23.50 | 0 | 0 days 09:27:16 |
|  | THE MERRY MAID OF ARCADY by MRS. BURTON HARRISON *1897* FIRST EDITION | $19.00 | 0 | 0 days 09:52:16 |
|  | LIVINGSTONE'S TRAVELS AND EXPLORATIONS IN SOUTH AFRICA *1858* FIRST EDITION | $57.88 | 8 | 0 days 10:12:32 |
| 🖼 | A Doctor of the Old School - I Maclaren 1895 | $6.00 | 0 | 0 days 12:30:40 |
| 🖼 | Treatise on Diseases of Women - Thomas 1876 | $21.57 | 7 | 0 days 13:07:57 |
| 🖼 | THREE HERIONES OF NEW ENGLAND ROMANCE *1894* | $27.00 | 0 | 0 days 13:15:32 |

FIG. 3E (Prior Art)

| | | | | |
|---|---|---|---|---|
| 📷 | 1795 BOOK MILTON'S PARADISE LOST ILLUSTRATED | $56.00 | 2 | 0 days 13:36:57 |
| 📷 | 1801 BOOK THEATRE ILLUSTRATED | $25.00 | 1 | 0 days 13:37:33 |
| 📷 | 1518 BOOK RELIGIOUS SERMONS 2 BOOKS IN ONE REALLY NICE SHAPE | $510.00 | 20 | 0 days 13:38:24 |
| 📷 | 1493 EARLY LEAF WITH BRIGHT RED HAND DONE INITIALS | $35.00 | 1 | 0 days 13:41:57 |
| 📷 | 1606 BIBLE LEAF ILLUSTRATED OLD TESTAMENT | $25.00 | 1 | 0 days 13:42:42 |
| 📷 | 1606 BIBLE LEAF ILLUSTRATED JESUS FROM BOOK OF LUKE | $36.00 | 2 | 0 days 13:42:20 |
| 📷 | C.A. 1440 EARLY BOOK LEAF ILLUMINATED CALENDAR LEAF | $63.55 | 10 | 0 days 13:44:09 |
| 📷 | VERY RARE 1895 edition of "Jack and the Beanstalk" Childrens Book!!! | $40.00 | 1 | 0 days 14:14:34 |
| 📷 | RARE!! 1895 edition of "Rip Van Winkle" Children Book | $40.00 | 0 | 0 days 14:18:59 |
| | THE GREAT EVENTS BY FAMOUS HISTORIANS, 3 VOLUMES OF A 1905 LIMITED EDITION SET | $12.00 | 0 | 0 days 14:38:40 |

FIG. 3F (Prior Art)

| | | | | |
|---|---|---|---|---|
| 📷 | 1758 Gentlemans Magazine-Painters-Plate | $17.00 | 0 | 0 days 15:45:28 |
| 📷 | 1793 Power of Attorney-Pennsylvania | $15.00 | 0 | 0 days 16:07:52 |
| | Traces | $275.00 | 0 | 0 days 17:33:20 |
| 📷 | A Grammer of the German Language - 1911 | $20.00 | 0 | 0 days 17:35:06 |
| | Rendezvous | $50.00 | 0 | 0 days 17:41:34 |
| 📷 | RARE OUTLAW VIGILANTE HANGMAN DOCUMENT! | $19.75 | 5 | 0 days 20:33:09 |
| 📷 | 4 ANTIQUE CHILDREN'S BOOKS - "ELF BOOKS" | $10.00 | 0 | 0 days 20:59:25 |
| | The "How I Was Educated" Papers, NYK 1888 | $5.00 | 0 | 0 days 21:28:24 |
| 📷 | KIPLING, BARRACK ROOM BALLARDS, LITTLE LEATHER LIBRARY MINIATURE | $4.25 | 0 | 0 days 21:39:33 |
| 📷 | Old Magic Instruction Book, Sleight of Hand, Edwin Sachs 1900 | $25.00 | 0 | 0 days 21:39:33 |

FIG. 3G (Prior Art)

| | | | | |
|---|---|---|---|---|
| 📷 | TURGENEV, MUMU, LITTLE LEATHER LIBRARY MINIATURE | $4.00 | 0 | 0 days 21:44:33 |
| 📷 | JAMES BARRIE, A TILLYLOSS SCANDAL, LITTLE LEATHER LIBRARY MINIATURE | $4.00 | 4 | 0 days 21:52:48 |
| 📷 | 1584 EARLY LEAF ORLANDO FURIOSO HAND COLORED ILLUSTRATED LEAF WITH GOLD | $102.50 | 15 | 0 days 21:59:49 |
| 📷 | The Prince of the House of David | $4.00 | 0 | 0 days 22:30:15 |
| 📷 | Old Church Songbook "Gem of Gems" 1881 | $6.00 | 0 | 0 days 23:30:15 |
| | last of the mohicans early 1900s | $14.95 | 0 | 1 day 08:32:15 |
| 📷 | ROMANCE & REALITY OF THE PURITAN COAST by Edmuch H. Garret *1897* | $19.00 | 0 | 1 day 09:12:52 |
| | The Bobbsey Twins | $4.25 | 3 | 1 day 09:20:59 |
| | Los Angeles Herald Examiner Newspaper Final Edition 8 / 14 / 84 | $500.00 | 0 | 1 day 09:20:59 |
| | The Bobbsey Twins in Washington | $4.25 | 3 | 1 day 09:22:58 |

FIG. 3H (Prior Art)

| | | | | |
|---|---|---|---|---|
| | The Bobbsey Twins in the Country | $2.50 | 1 | 1 days 09:26:02 |
| | RUSSIAN PHOTO ALBUM "CZAR NICHOLAS II" - ROYALTY | $44.99 | 0 | 1 days 09:30:12 |
| 📷 | Treasure Island 1st Edition Pocket Reader | $50.00 | 0 | 1 days 10:59:32 |
| 📷 | Frank Baum's The Tin Woodsman of Oz | $50.00 | 0 | 1 days 11:01:22 |
| 📷 | 1918 Edition of '21' by Frank Crane!! | $35.00 | 0 | 1 days 11:26:30 |
| 📷 | VERY RARE BOOK POSSIBLY FROM ?1888? "GERMANIA JUGENDBIBIOTHEK" | $25.00 | 0 | 1 days 11:44:05 |
| 📷 | RARE COPY of William Shakespeare's "Julius Caesar" | $25.00 | 0 | 1 days 11:45:03 |
| 📷 | RARE BOOK!!! 'IDYLLS OF THE KING' BY TENNYSON DATED 1903 | $25.00 | 0 | 1 days 11:45:56 |
| | GRANT MOVES SOUTH BY BRUCE CANTON | $15.95 | 0 | 1 days 12:43:43 |
| | MARY QUEEN OF SCOTS BY JACON ABBOT | $9.95 | 0 | 1 days 12:59:09 |

More

Top of Page

Amazin.com Home | Books | Music | Video | Gifts | e-Cards | Austions | I-Click | Shopping Cart
Your Account | Help Auction Search | Browse Categories | Getting Started | Your Auctions | Sell an Item Now Amazin.co.uk | Amazin.de Copyright and disclaimer © 1996-1999; Amazin.com, Inc.

FIG. 3I (Prior Art)

amaz*n*.com

🛒 | HELP
YOUR ACCOUNT

| WELCOME | BOOKS | MUSIC | VIDEO | TOYS & GAMES | ELECTRONICS | e-CARDS | AUCTIONS |

| AUCTION SEARCH | BROWSE CATEGORIES | GETTING STARTED | YOUR AUCTIONS | SELL YOUR ITEM NOW |

Auction Search: [_____] [Go!]    Browse: [All Categories ▼] [Go!]

22:31:52 PDT

Auctions / Antiques / Books & Manuscripts        Sell an item now in Cameras

Full Results                         Sort by: [End date ▼]
Items 1 to 7 are shown below.
                                         ○ Ascending  ○ Descending  [Go!]

Show: Open | New | Closing Today | Closing in 5 hours | Closed

| Picture | Auction Name | Current Bid | Bids | Time Remaining |
|---|---|---|---|---|
| 📷 | Kadak Junior | $30.00 | 0 | 1 days 09:48:31 |
| 📷 | 1950's Era Standard Flip Film Typre Projector | $9.50 | 0 | 2 days 07:15:07 |
| 📷 | Ols Fashioned Bellows Camera Porcelain Box | $7.85 | 1 | 3 days 00:08:51 |
| 📷 | OLD FRENCH CAMERA COMPLETE WITH LEATHER CASE, GOOD SHAPE, USED | $56.00 | 2 | 3 days 22:55:11 |
| 📷 | Falcon Bakelite Art Deco Camera | $17.50 | 5 | 4 days 16:45:40 |
| 📷 | Antique 1920s Kadak 1A Pocket Camera w/ Case | $45.00 | 0 | 6 days 09:29:10 |
| 📷 | AGFA Plenachrome Camera Film dated 1943! WATAFIND! | $2.50 | 0 | 8 days 18:00:08 |

Top of Page

Amazin.com Home | Books | Music | Video | Gifts | e-Cards | Austions | I-Click | Shopping Cart
Your Account | Help
Auction Search | Browse Categories | Getting Started | Your Auctions | Sell an Item Now
Amazin.co.uk | Amazin.de
Copyright and disclaimer © 1996-1999; Amazin.com, Inc.

FIG. 3J (Prior Art)

SYSTEM FOR INTERACTIVE COMPUTER-ASSISTED ON-LINE AUCTIONS

CROSS-REFERENCE TO RELATED APPLICATIONS

This application is a continuation of U.S. patent application Ser. No. 15/330939, filed Mar. 12, 2014, which claims benefit of U.S. patent application Ser. No. 13/472226, filed May 15, 2012, now U.S. Pat. No. 8,688,546, issued Apr. 1, 2014, which claims benefit of U.S. patent application Ser. No. 12/464047, filed on May 11, 2009, now U.S. Pat. No. 8,204,801, issued Jun. 19, 2012, which claims benefit of U.S. patent application Ser. No. 09/628773, filed Jul. 29, 2000, now U.S. Pat. No. 7,542,920, issued Jun. 2, 2009, which claims the benefit of U.S. Provisional Patent Application No. 60/146,702, filed Jul. 30, 1999.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

The present invention relates to novel methods and apparatus for conducting, presenting, monitoring, and tracking auctions on-line, for pure Internet auctions, and real-time presentation of physical auctions. The methods and apparatus disclosed in this application can also be use in all on-line object and catalogue presentations and other E-commerce sales and advertising channels and mechanisms.

Description of Related Art

Traditional physical auctions of goods and services take place as events with defined time periods, at defined and limited physical locations where the buyers, on-lookers, commissioned sellers, sellers, trained auctioneers, and the goods gather. In some instances, with pre-arranged facility, remote buyers can be linked at real-time to the auction, via private or public radio, television, or telephone network, and call-in bids remotely over telephone connections. The real-time broadcast or narrowcast of an auction through radio, television, or telephone networks can be costly, and access is usually limited to specific locations/rooms with the relays or connections. Therefore, the conventional physical auction events are considered restricted to a limited buyer audience who can either physically attend the auction at location, during that specific time frame, or be present at a remotely linked facility also at that specific time frame. The costly, time specific physical gathering of a "live" auction event is only worthwhile or feasible for both the auctioneer's and the buyers' sides, if, and only if there is a large number of items to be sold. However, only one item can be "auctioned" at a time, in a physical live auction event. Thus, each item has a very limited time allotment to be on the auction stage.

Some items stimulate more interest than others in an unpredictable way in a time limited physical live auction event. The buyers come to, and leave the event also in somewhat of unpredictable ways, it is difficult for a live auction event to publish and commit to a fixed item-by-item schedule in a catalogue ahead of the event. Therefore, buyers do not know what item would be auctioned at what time frame, and what items would be auctioned next even while at the auction. Buyers do travel to the location; frequently to miss the items most interested, unless he or she is willing to arrive on-time, and commit to sit through the entire auction event without breaks. Wealthy collectors or dealers often go through the preview, note the interested items manually, and give instructions as to the highest price they would be willing to pay for each item to hired professional buyers/bidders to attend the event and do the bidding. The process is manual, labor intensive, and somewhat risky for both the hiring collectors and their hired buyers.

The new Internet "cyber" Auction format, on the other hand, allows buyers, sellers, and spectators to browse and search for information, descriptions, and auction status of goods, and submit bids without geographical or strict time limitations. All items, independently, can be "auctioned" during the same time period, in parallel, and simultaneously. The duration for each "item" in "open auction" is largely defined by the owner of the item or his agent, and independent of other items. The duration is measured in days or weeks, rather than the minutes as custom and necessary in a physical live auction. The beginning and ending times of "open auctions" are published individually in each item's entry. Data entry is left to the owners of objects with templates provided by the sites. The sites has no organized data on what objects may become available for auction, and do not publish up-coming auctions.

At Ebay.Com (FIG. 1, Jul. 15, 1999), the largest Internet auction site, millions of objects are "auctioned" at any given time. Search for goods is accomplished through browsing the extensive category trees/paths (FIG. 1A), or entering item type or name through a "search" function. The auction item list obtained through category browsing is astoundingly large, on the order of hundreds to thousands of items, over many tens of web-pages (each can be more than one physically printed page), listed with an abbreviated one-line entry or a thumbnail entry for each item. FIGS. 1B-1G are 6 pages of a list of "Featured" furniture auction items, and FIG. 1H-1J is the $1^{st}$ page of 37 pages of 1761 furniture items being auctioned on the Ebay.Com site on Jul. 15, 1999. Note that the right most column indicates the "ending time" of the auctions, mostly ending around July 22 through July 25, a ten day auction time span, impossible to accommodate in conventional "live" auctions, which measure auction time for each item in minutes. Choosing items out of such a large list can only be accomplished by reading through tens or hundreds of one-line abbreviated descriptions of each item, and choosing one item from the list to view the more detailed information about the item, one-at-a-time. Once an item is thus chosen, the browser/buyer clicks on the line or thumbnail entry of the item on the list (see FIG. 1K-1M, item 122 on the page), and waits for its descriptions to be sent to the screen from the remote site server (FIGS. 1N and 1O.) If the buyer wishes to view more items from the list of hundreds of items, it can only be done, again, one-at-a-time, by clicking "back" to the list, and choose another item, click on the item, wait for page download, thus repeating. When the buyer is viewing information about one interested item, the information for other items previously viewed are gone from the screen. The buyer must print all information of every item, before clicking "back" to the list to access information of another item. The comparison between similar or interested items can only be reasonably done by reading the volume of printout pages of these items. At the mean time, the auction status and current high-bid of some items may have already changed. Although such process is tedious and time consuming, for many people, it is still preferred over making the effort required to attend a conventional physical "live" auction.

Bidding is entered electronically on a bidding screen that usually follows the bidding information, object description, and photograph(s) of the object. For a single item auction, the bid entered at any given time must "beat" the current highest bid to be relevant and logged into bidding history as the updated highest bid. For a "Dutch Auction," where multiple numbers of an identical item are auctioned, the bid must be higher than the current lowest valid bid. Every "current highest bid" is there to be outbid before the "auction time" is still open. It is highly desirable to a serious buyer to monitor the bidding status, and bid only when "closing" time comes near.

With the current state of the art in online auction, such monitoring is accomplished through manually logging onto the site at any particular time, go to the pages where a particular item of interest is described, look up the bidding status of that particular item, and the closing time of this particular auction. Set an alarm clock for certain intervals before its "closing time," for final check, which could be days later. At any moment between the time you last manually checked the auction status, and the time of the alarm, the auction status can only be updated by manually and periodically logging on to the site, and going to the particular pages describing the item, one item at a time. If the buyer is interested in a number of items, the process is extremely tedious, time consuming, and unreliable. One can enter a bid, request email notification from the site when the bid is "outbid" by another buyer. However, this is a one-time only notification. To be notified again, one must enter another bid that beats the current highest bid, and risking buying the object at that price, or to be outbid again.

For a physical live auction event, there is no way to monitor the event other than being physically present.

FIGS. 2A-2I are screen prints of Auction.Yahoo.Com, and FIGS. 3A-3J are screen prints of AmazonAuction.Com, illustrating the two sites' identical formats to Ebay.Com. This universal Internet Auction Format is used with very minor variations on the theme in all state-of-the-art auction sites. Basically, the home pages of the auction sites contain a primary category listing, a "featured" listing, a "search" entry box, and some informational/promotional icons, textual descriptions, and links. Clicking on a category title on the primary category list brings the next page containing the listing of the next level of categories under that particular category, and a list of the "featured" items in that category. Clicking on one "featured" title brings information about that one particular "featured" item. Similarly, clicking on brief descriptions of promotional or informational entries and icons brings more detailed information about the entry. Clicking on a subcategory brings the listing of the next level subcategories and the "featured" items in that subcategory, until the particular category path is exhausted. Then, all items under that end category is listed over many web pages, accessible one web-page at a time, each containing more than one physical print page. Links to information of Items listed on a web page are accessible also one-item-at a time. Entering a search word or a search phrase brings a list of items that contain the word or phrase in the tagging header or in the description.

Although facilitated to provide simultaneous auctions, Internet format of the known-art does not allow viewing, monitoring, or tracking of simultaneous auctions of multiple items. As described previously, a buyer can elect to visit the "biding" screen, enter a bid for each interested item, and request to have electronic-mail (email) sent to his/her email account as a one-time notification when a bid is outbid. Or the buyer can periodically log-on to the auction site, and manually search and browse for status information of interested items, one at a time.

SUMMARY OF THE INVENTION

The present invention relates to novel methods and apparatus for conducting, presenting, monitoring, and tracking auctions on-line, for pure Internet auctions, and for real-time internet presentation of live physical auctions. The "current" auction objects are presented in moving graphical arrays that can be sorted by columns or rows, commanded to moved to show items beyond the screen, or stopped to select individual items to obtain further information or to be monitored and tracked. The "up coming" objects that are soon to be "open" for bidding are shown on a separate strip on the screen. The strip "cycles" onto the screen to accommodate displaying more objects, than the screen size can accommodate. The moving strip can also be activated to step in the opposite direction, or stopped for detailed view, or selected for monitoring, tracking, or to obtain further information. The displaying and selection method and apparatus can also be used for other e-commerce sales channels and catalogs.

Selected objects from different categories, or even different sites can be monitored and tracked on the same screen.

Self-rotating, automated Virtual Reality is used to display three-dimensional objects. Split screen allows video broadcasting, narrow casting, or streaming of "live auction" events alongside detailed still or virtual reality images of auctioned objects, their descriptions, and the bidding entry form, as well as the running strip cataloguing the upcoming lots/items.

The methods and apparatus disclosed in this application can also be use in other types of on-line object and catalogue displays, and other E-commerce channels and services, in addition to the auction format.

BRIEF DESCRIPTION OF THE DRAWINGS

FIGS. 1A-1O are conventional EBAY auction web site views.

FIGS. 2A-2I are conventional YAHOO! auction web site views.

FIGS. 3A-3J are conventional AMAZIN.COM auction web site views.

FIG. 4A shows the "featured", and "search," or "category" browsing results are shown in a graphical array, with multiple-select capabilities. The "upcoming" auctions are announced in a cycling or stationary (scrolled to view) margin-strip at the right side. The "present" auctions are presented in rows.

Each row of the array can advance to left, back to right, continually move (GO button) to show more items, or stop, at command by clicking on the commend buttons at the left margin of the row. The "upcoming" column on the right has similar functions. The movement for the column is up-down movement.

In this particular presentation example, we have chosen 3 categories and the "featured." The same method and apparatus can present items of the same category, or the subcategories within a category, for example, separating sports cars of different manufacturer.

Figure 1A:
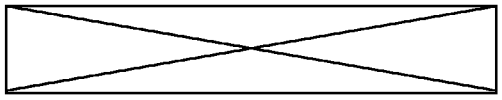
Figure 3B:
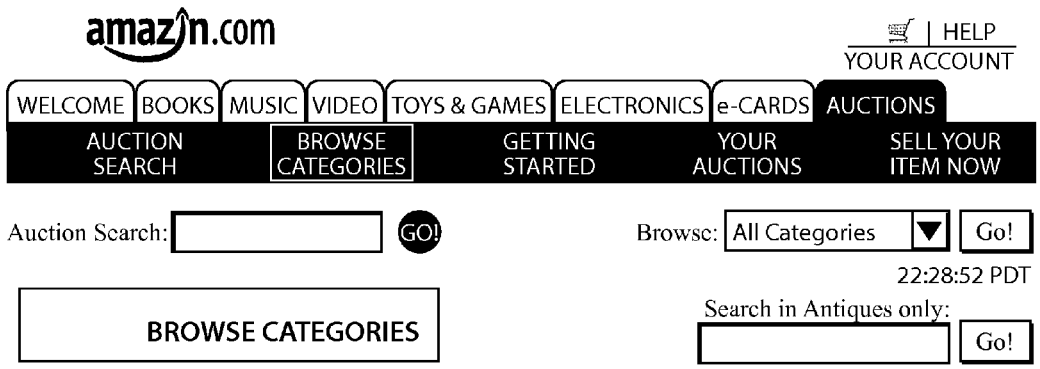
Figure 4A:
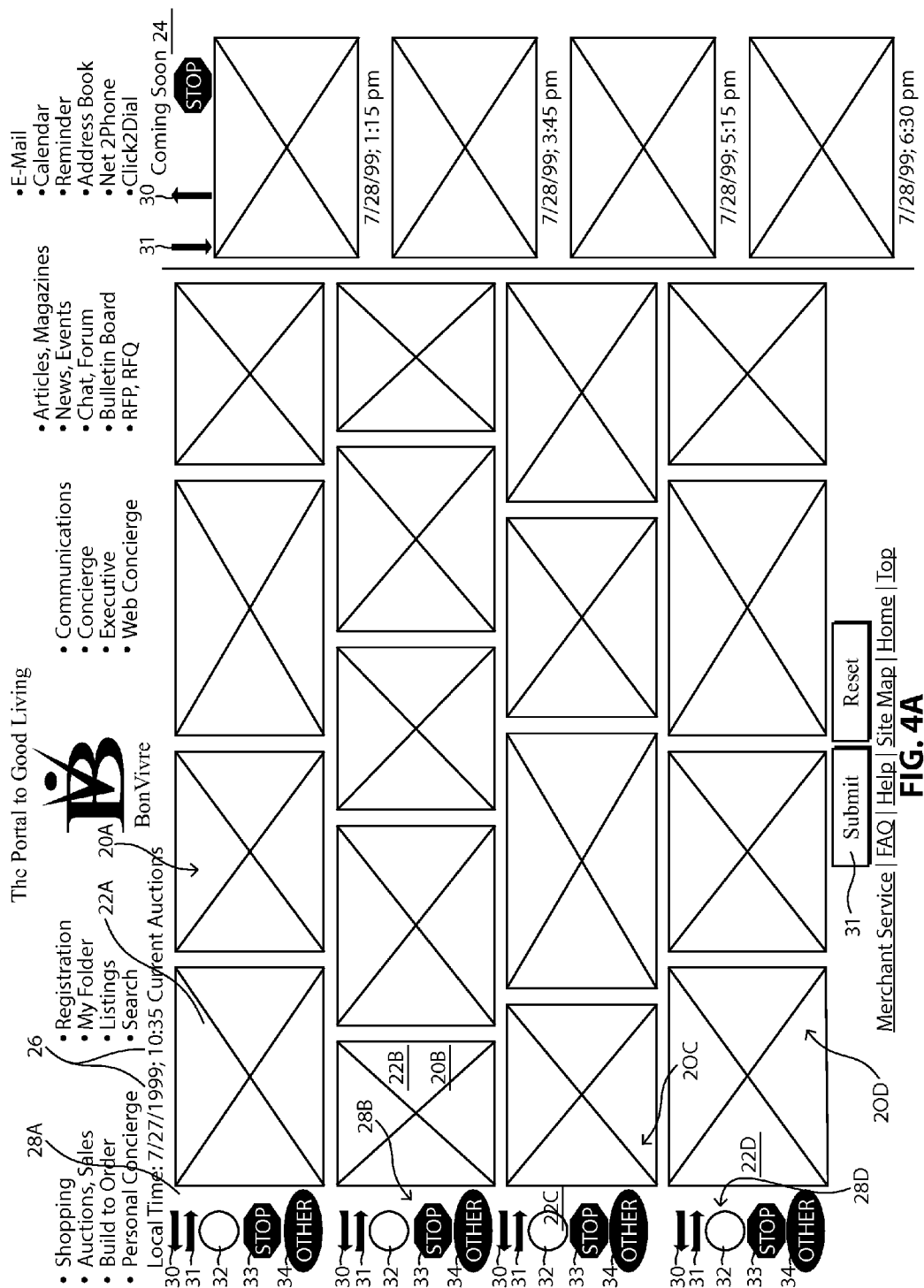
FIGS. 4A-4D: An example of an On-Line Auction presentation implemented with the current invention.
Figure 4B:
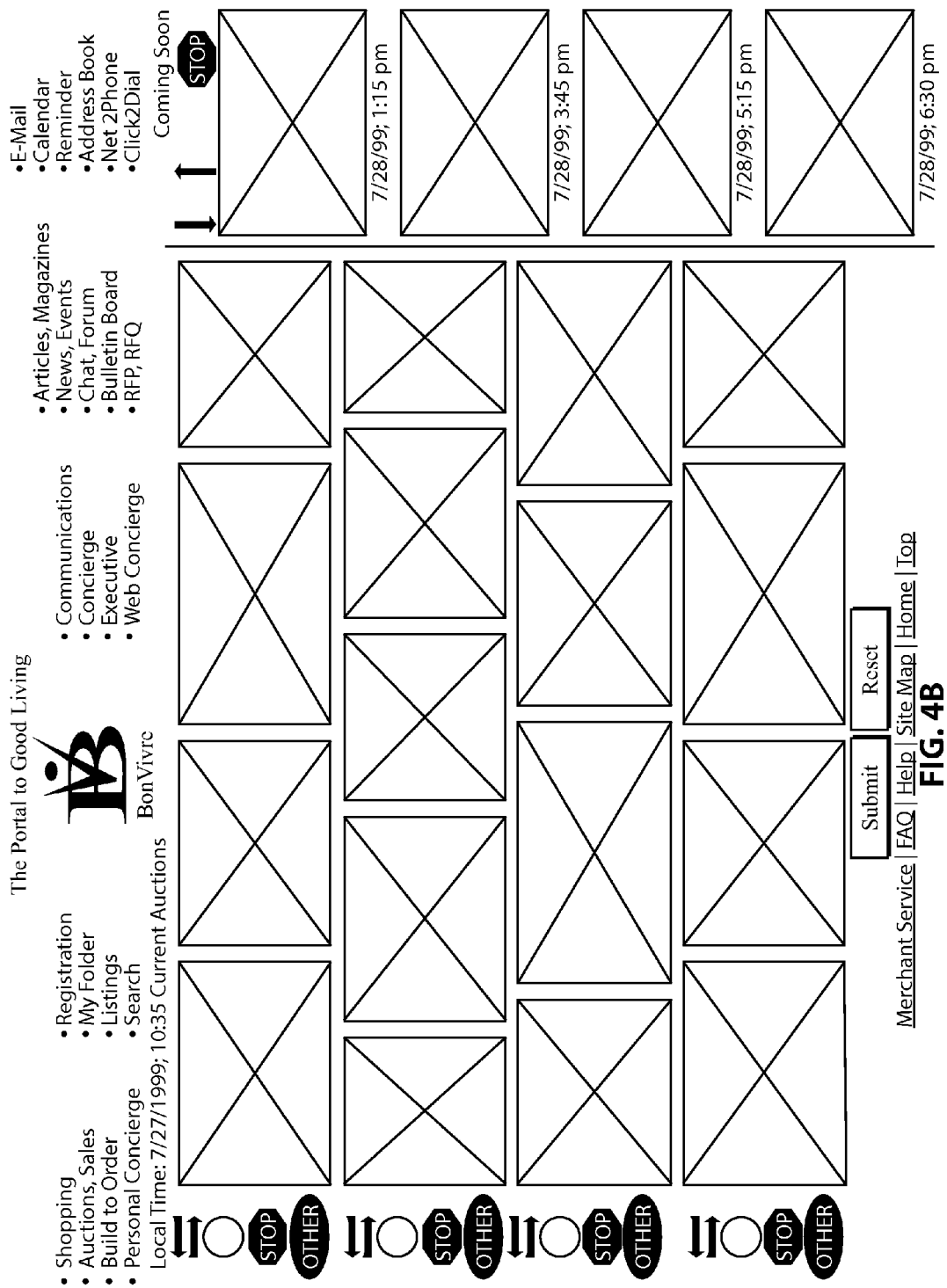

FIG. 4B shows the screen shot of the Auction home-page screen at some time later. Due to exercising the moving functions, some items have changed positions on the array, some items have left the screen, and some items not shown in 4A appear on the screen.

Figure 4C:
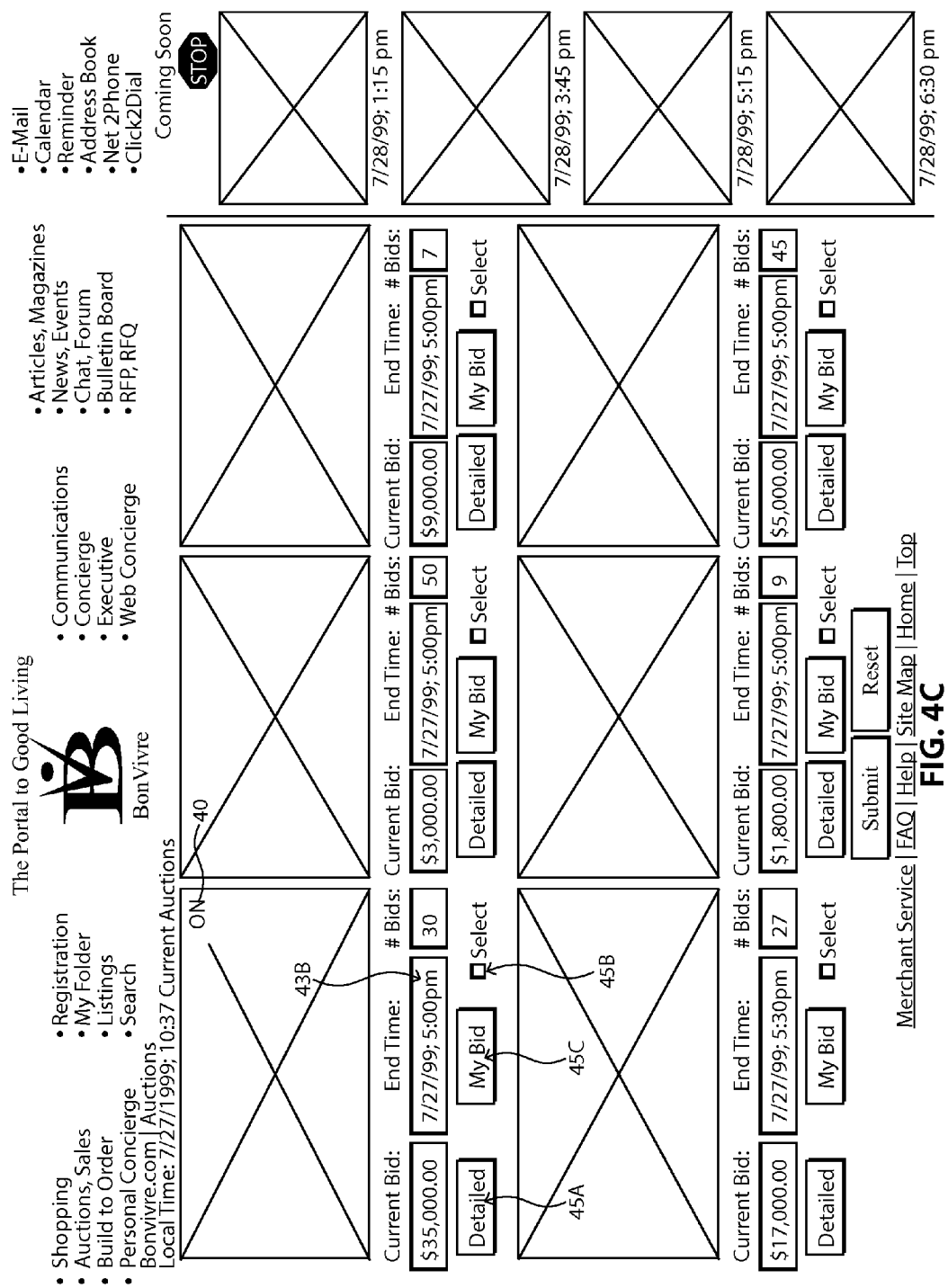

FIG. 4C shows the selected items from FIGS. 4A and 4B appear on a monitoring screen.

The screen is automatically tracked/updated by synchronizing with the server data at user programmable intervals. Object that should be seen from all sides has an "On" button in a portion of its still image. Clicking the "ON" button turns on the Virtual Reality with automated rotation as well as mouse driven rotation features. The "ON" button can be replaced by "VR" or any other form that representing turning on "Virtual Reality." Detailed information for each monitored object can be called individually by clicking on the "Detail" button, or selectively and collectively by clicking the "select" boxes, and submitting requests to the server after completing the selection process. The object positioning in the array can be sorted with various criteria at user request or default setting. The "alert" can also be programmed, for example, to surround "End Time" box with small blinking stars, or any other attention causing signal, to signal the end of "open" auction within 30 minutes (or an hour), and blinking red stars for "My bid" button when "my bid" is out bid.

Figure 4D:
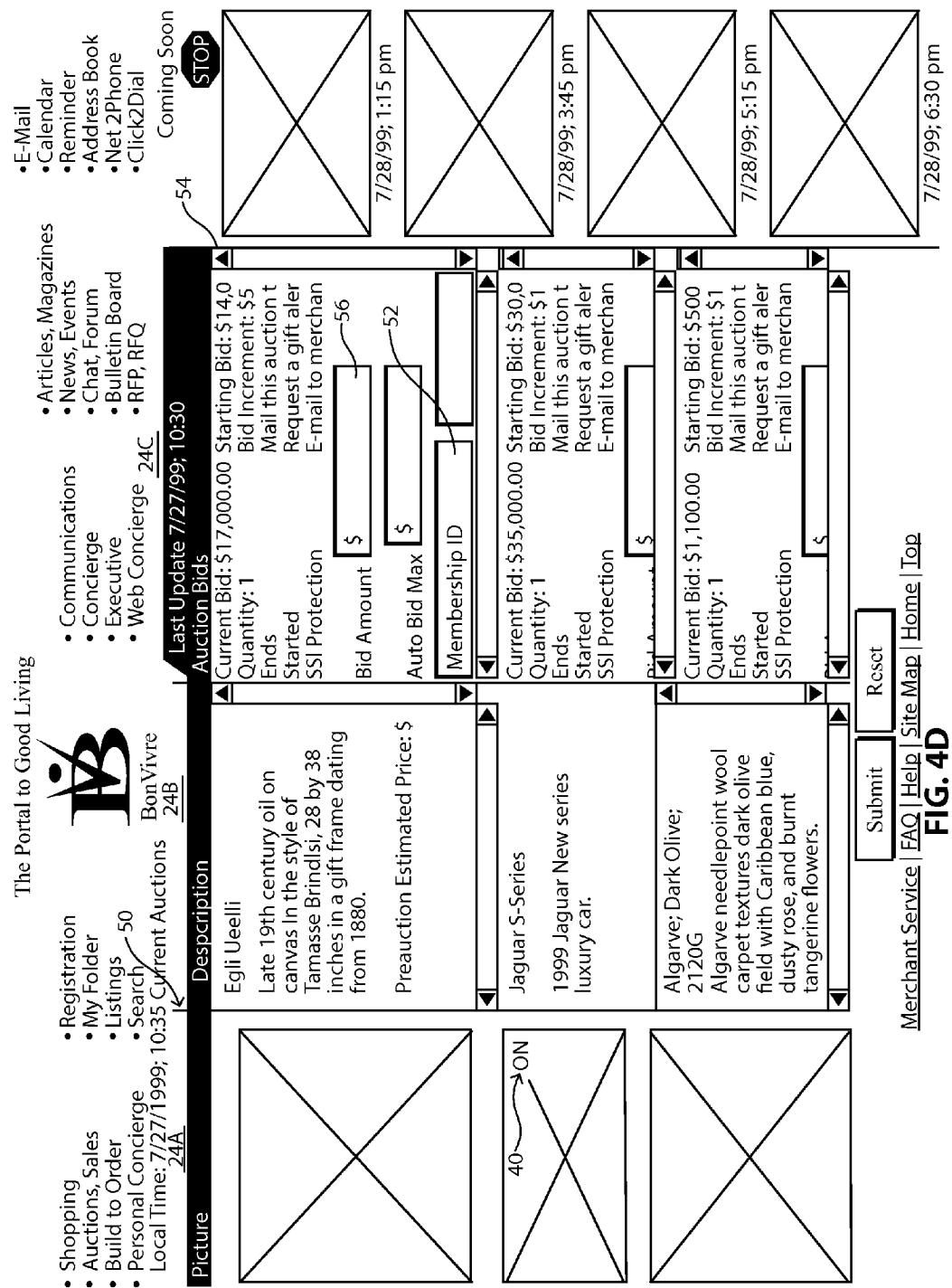

FIG. 4D shows selection of objects monitored in screen FIG. 4C for viewing detailed information and access bidding apparatus collectively, would bring this screen after submitting the selection. In this example, The Egli Ucelli landscape painting, the Jaguar S-series, and the Algarve rug are selected.

Figure 5:
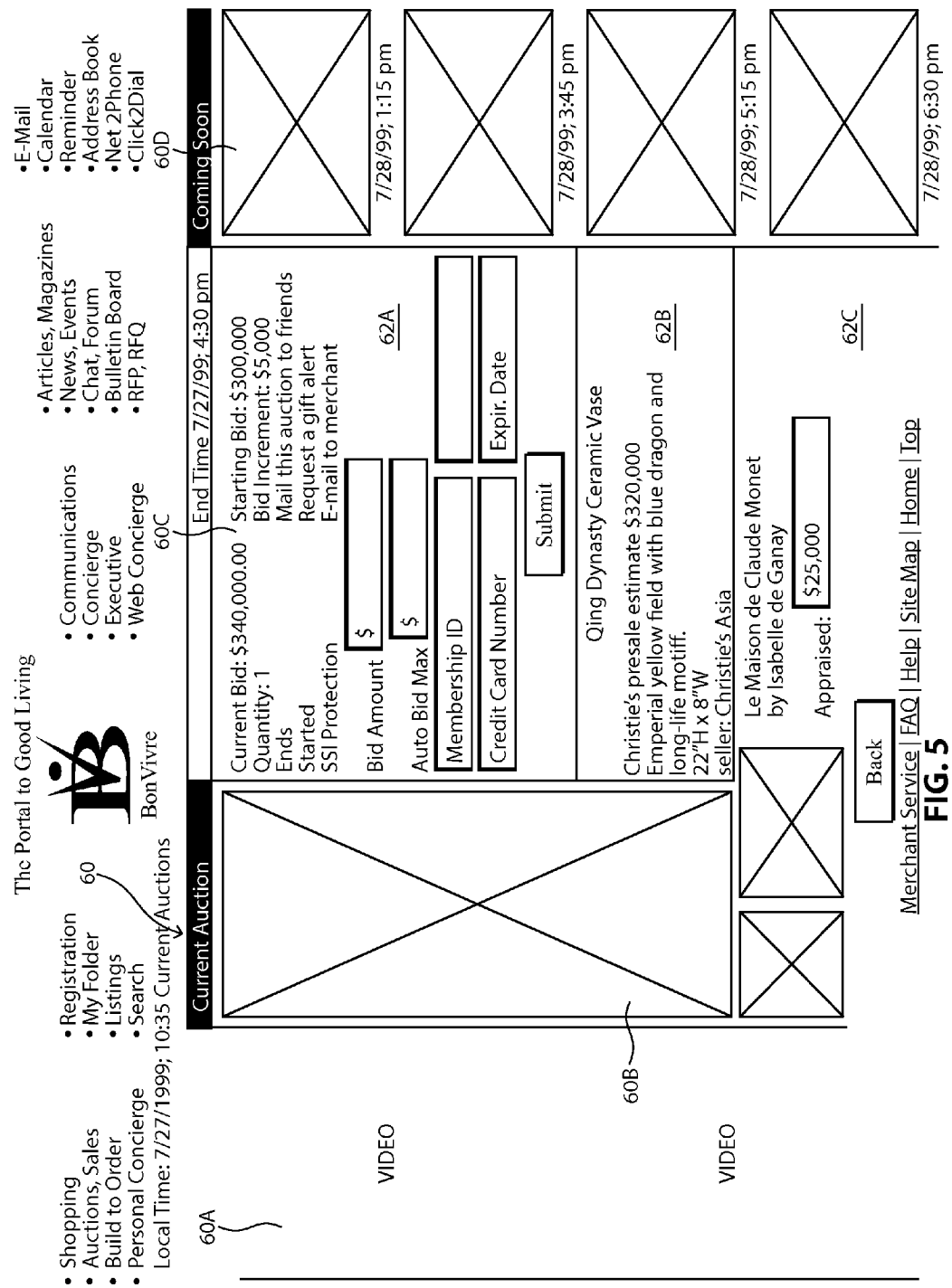

FIG. 5 shows an example of the "Live" Auction Format of the Present Invention.

DETAILED DESCRIPTION OF THE INVENTION

The present invention relates to novel methods and apparatus for conducting, presenting, monitoring, and tracking auctions on-line, for pure Internet auctions, and for real-time linking to physical auctions. The "current" auction objects are presented in moving graphical arrays 20A, 20B, 20C and 20D that can be sorted by rows 22A, 22B, 22C and 22D or columns, and moved bi-directionally to show more items than the computer screen size can accommodate, or stopped to select individual items to obtain further information, or to be monitored and tracked. The "up coming" objects that are soon to be "open" for bidding are shown on a separate strip 24 on the screen. The strip 24 and the sorted rows 22A, 22B, 22C and 22D or columns can be commanded to "cycle" onto the screen continually to display objects beyond the screen. The moving strip can also be activated to step in both directions, and stopped for detailed view or selection for monitoring, tracking, or to obtain further information. The displaying and selection method and apparatus can also be used for displaying catalogs and other e-commerce channels and services.

Selected objects from different categories, or even different sites can be monitored and tracked on the same screen.

Self-rotating, automated Virtual Reality is used to display three-dimensional objects. Split screen 60 (FIG. 5) allows video broadcasting, narrow casting or streaming of "live auction" events, or fashion catwalk events 60A alongside detailed images of auctioned objects 60B, their descriptions, and the bidding entry form, as well as the running strip cataloguing the upcoming lots/items for auction or catwalk.

The methods and apparatus disclosed in this application can also be use in other types of on-line object and catalogue displays and other E-commerce channels, mechanisms, and services in addition to the auction format.

The present invention presents objects presently open for auction in each category on a graphical array 20A, 20B, 20C or 20D, with the "up coming auctions" running on a margin strip 24. A time stamp 26 signifies the time the information is loaded to the computer at its latest synchronization/update. The array 20A, 20B, 20C or 20D can be sorted by user specified or default criteria in columns or rows. Command buttons 28A, 28B, 28C, 28D or 28E providing options allowing viewers to start, or stop the cycling, use the scroll button to scroll up or down, or left or right, to see more items. The bidder/viewer selects interested objects from the array 20A, 20B, 20C or 20D of either the same category, or from different categories, or even from different sites, and/or the interested "upcoming" objects from the margin strip 24. The "auction wizard" of the current invention fetches the detailed information and enlarged graphics of the selected items from the site databases, and composes a personalized auction monitor screen (FIG. 4C) for the bidder/viewer. The screen is automatically updated with new status, at user programmable intervals. If the bidder/viewer's computer is disconnected from the server, the synchronization occurs automatically upon reconnection.

Differentiated level of selections can be made, and the array presentation can be sorted by category, or with other criteria of differentiation. "Alert" is programmed to user selectable criteria, such as closing time, outbid, etc. Default setting can be provided, for example, to alert closing time in one hour or less, or outbid by others.

Dropping items from monitoring screen (FIG. 4C) can also be programmed to criteria, such as highest bid going beyond a certain price, or successful final bid of another similar item, etc. Monitoring is automatically dropped when closing is over, and status sent to "closed auction report" folder.

Automated 3D Virtual Reality presentation is used to display three-dimensional objects, such as sculptures, cars, lamps, or furniture, revolving on the screen automatically. "ON" Buttons 40 are provided to the VR presentation for viewer to elect using the mouse to rotate the object, or to resume the automated rotation. The "ON" button 40 is provided on still images of three-dimensional objects for activating Virtual Reality presentation upon clicking.

"Split Screen" 60 accommodates broadcasting, narrow casting, and streaming video 60A for viewing the live auction events, alongside the web images, VR or 3D presentations of the object 60B, detailed textual descriptions, and the online "bidding" mechanism 60C, for linking "live auction" sessions to the on-line auction network.

An example of an On-Line Auction presentation implemented with the current invention is illustrated in FIGS. 4A-4D. FIG. 4A shows "search," or "category" browsing results, and the "featured" items in a graphical array, with multiple-select capabilities. The "upcoming" auctions are announced in a cycling or stationary (scrolled to view) margin-strip 24 at the right side. The "present" auctions are presented in rows 22A, 22B, 22C and 22D, and sorted in rows according to category criteria.

A set of command buttons 28A, 28B, 28C and 28D are placed at the left margin of each row 22A, 22B, 22C and 22D, respectively, to enable each row 22A, 22B, 22C and 22D of the array to advance to the left, or back to the right by pressing the mouse button on the arrows 30 or 31, or to continually move for showing more items beyond the screen by clicking on the "GO" button 32, or stop at command by clicking on the "STOP" button 33. The "Other" button 34 allows the viewer to select to view items from other categorization. The "upcoming" column on the right (strip 24) has similar functions. The movement for the column is up-down movement via arrows 30' and 31' instead of the left-right for the rows of "present auctions."

In this particular presentation example, we have chosen 3 categories and the "featured," items for the rows. Other criteria can be used, such as displaying subcategory items from the same category, for example, sports cars of different manufacturer, or displaying same category items sorting by ending time, etc.

Each item on the array is selectable. The viewer can select as many items from the array as desired for monitoring, for detailed information, or for bidding. When the selection process is completed, the viewer "submits" the selection by clicking the mouse button on the "Submit" button 37 located at the bottom of the screen.

FIG. 4B shows the FIG. 4A screen at some later time. Due to exercising the moving functions, some items have changed positions on the array, some items have left the screen, and some items not shown in FIG. 4A appear on the screen.

FIG. 4C displays the viewer-selected items from FIGS. 4A and 4B on a monitoring screen. The screen is automatically tracked/updated by synchronizing with the server data at user programmed or default intervals. Three-dimensional object that should be seen from all sides has an "On" button 40 in a portion of its still image. Clicking the "ON" button 40 turns on the Virtual Reality with automated rotation as well as mouse driven rotation features. The "ON" button 40 can be replaced by "VR" or any other form that representing turning on "Virtual Reality." Detailed information for each monitored object can be called individually by clicking on the "Detailed" button 45A, or selectively and collectively by clicking the "select" boxes 45B, and submitting requests to the server after completing the selection process. The object positioning in the array can be sorted with various criteria at user request or default setting. The "alert" can also be programmed, for example, to surround "End Time" box 43B with small blinking stars, or any other attention causing signal, to signal the end of "open" auction within 30 minutes (or an hour), and blinking red stars for "My bid" button 45C when "my bid" is out bid.

Selecting objects monitored in screen FIG. 4C for viewing further detailed information and access-bidding apparatus collectively would bring the screen 50 shown in FIG. 4D after submitting the selection. In this example, The Egli Ucelli landscape painting, the Jaguar S-series, and the Algarve rug are selected. The Jaguar has Virtual Reality presentation, activated by clicking on the "ON" button 40. The column 24B in the middle are textual descriptions for the items, and the Auction bids column 24C to the right is where the auction status is presented, updated, and where bids (in "Bid Amount" box 56) can be entered. The membership ID number 52 only has to be entered once. The scroll bars 54 indicates there is more information in the box than what is shown. When the cursor is moved into the frame, where only partial information is shown, the full frame would pop-up.

FIG. 5 shows an example of the "Live" Auction Format of the Present Invention. The 2 boxes at left are real-time, live streaming, broadcasting, or narrowcasting of live scenes at the physical auctions. The upper portion of the second column 60B from the left displays either still image of a 2-D object, or still image of a 3-D object, with Virtual Reality option upon clicking on the still image. The upper portion of the 3.sup.rd column 60C includes bidding screen 62A and description screen 62B. The lower portion 62C displays the next item to be auctioned, and the right column 60D displays the upcoming objects after the next auction in their time order. Bringing the cursor onto an image, the brief description is shown in a floating box. Clicking on the image brings detailed descriptions.

The present invention is implemented using software which can be written in many programming languages, or implemented with many web-page generation tools. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed on a display device. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

The invention claimed is:

1. A computer implemented method for conducting commerce and displaying on a display device information regarding objects that can be purchased, wherein the display device is controlled by at least one networkable computer with a processor and memory and one or more programs, the method comprising:

displaying on a display device a plurality of digital information elements in graphical or imagery thumbnails organized in a categorized array, wherein the digital information elements represent items that can be purchased, and are capable of being displayed in virtual reality;

enabling a user to select at least one of the digital information elements;

displaying information relating to the item represented by the selected digital information element, wherein the information includes a description of the item represented by the selected digital information element, and a link to conduct a commerce activity relating to the item;

causing a virtual realization of the selected item to be displayed on the display device automatically when a webpage containing information associated with the selected item is accessed;

monitoring the commerce activity status of the item represented by a selected digital information element; and notifying the user when commerce activity occurs with respect to the item represented by a selected digital information element;

wherein the user is an administrator.

2. The method of claim 1, wherein the user notification occurs on a webpage.

3. The method of claim 1, wherein the user notification is transmitted in the form of an electronic mail.

4. The method of claim 1, the commerce activity relates to a bid associated with an auction.

5. The method of claim 4, wherein the user notification is in response to a bid being placed that exceeds a bid placed by a user.

6. The method of claim 1, including three-dimensional rotation of at least one item represented by the selected digital information element.

7. The method of claim 6, wherein the three dimensional rotation includes rotation around at least one axis.

8. The method of claim 1, wherein the displaying of information related to a selected item represented by its associated digital information element is in response to a user selection.

9. The method of claim 1, wherein the displaying of information relating to an item represented by the selected digital information element includes displaying the status of commerce activity associated with the item.

10. The method of claim 9, wherein the commerce activity relates to a bid associated with an auction.

11. The method of claim 1, wherein the item represented by the selected digital information element is at least one of a painting, a photograph, a coin, a sculpture, a furniture item, a piece of jewelry, a timepiece, an electronic device, a travel package, a hotel stay, a meal in a restaurant, or a concert.

12. A system comprising:
a computer readable storage medium capable of non-transitorily storing one or more programs configured for execution by one or more computer processors, wherein the one or more processors are communicatively coupled to a display device configured to be controlled by the one or more programs, the one or more programs comprising instructions that cause the one or more processors to:
display on the display device a plurality of digital information elements, wherein the digital information elements represent physical items viewed in virtual reality;
enable a user to select at least one of the digital information elements;
display information about the physical item represented by the selected digital information element, wherein the information includes a description of, and a link to conduct commerce activity related to, the physical item represented by the selected digital information element; and
enable changing of a displayed perspective of the virtual realization of the physical item represented by the selected digital information element;
wherein a user is an administrator of the digital information elements associated with items represented by said digital information elements stored on the said storage medium; and,
wherein the one or more programs are configured to enable an administrator user to program at least one selected item to undergo a change in the displayed perspective on the display device automatically when a webpage containing information associated with the selected item is accessed.

13. The system of claim 12, wherein the user is an administrator of a database containing the information about the item.

14. The system of claim 12, the commerce activity relates to a bid associated with an auction.

15. The system of claim 12, including three-dimensional rotation of at least one item represented by the selected digital information element.

16. The system of claim 15, wherein the three dimensional rotation includes rotation around at least one axis.

17. The system of claim 12, wherein the display of information is in response to a user selection.

18. The system of claim 12, wherein the display of information includes displaying the status of commerce activity associated with the item.

19. The system of claim 12, wherein the commerce activity relates to a bid associated with an auction.

20. The system of claim 12, wherein the item represented by the selected digital information element is at least one of a painting, a photograph, a coin, a sculpture, a furniture item, a piece of jewelry, a timepiece, an electronic device, a travel package, a hotel stay, a meal in a restaurant, or a concert.

* * * * *